United States Patent
Lee et al.

(10) Patent No.: US 12,032,344 B2
(45) Date of Patent: *Jul. 9, 2024

(54) ADAPTIVE SELECTION OF MACHINE LEARNING/DEEP LEARNING MODEL WITH OPTIMAL HYPER-PARAMETERS FOR ANOMALY DETECTION OF CONNECTED EQUIPMENT

(71) Applicant: Tyco Fire & Security GmbH, Neuhausen am Rheinfall (CH)

(72) Inventors: Young M. Lee, Old Westbury, NY (US); Sugumar Murugesan, Santa Clara, CA (US); ZhongYi Jin, Santa Clara, CA (US); Jaume Amores, Cork (IE)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,983

(22) Filed: Jul. 6, 2023

(65) Prior Publication Data
US 2023/0359157 A1 Nov. 9, 2023

Related U.S. Application Data

(63) Continuation of application No. 17/963,699, filed on Oct. 11, 2022, now Pat. No. 11,747,776, which is a
(Continued)

(51) Int. Cl.
*G05B 13/04* (2006.01)
*F24F 11/38* (2018.01)
(Continued)

(52) U.S. Cl.
CPC ............ *G05B 13/048* (2013.01); *F24F 11/38* (2018.01); *F24F 11/63* (2018.01); *F24F 11/64* (2018.01);
(Continued)

(58) Field of Classification Search
None
See application file for complete search history.

(56) References Cited

U.S. PATENT DOCUMENTS

| | | |
|---|---|---|
| 5,692,107 A | 11/1997 | Simoudis et al. |
| 7,552,035 B2 | 6/2009 | Cataltepe et al. |
| | (Continued) | |

FOREIGN PATENT DOCUMENTS

| | | | | |
|---|---|---|---|---|
| CA | 2676441 A1 * | 8/2007 | ............. | G05B 17/02 |
| WO | WO-2018112352 A1 | 6/2018 | | |

OTHER PUBLICATIONS

Butler, K. L., "An Expert System Based Framework for an Incipient Failure Detection and Predictive Maintenance System," IEEE, 1996 (pp. 321-326).

(Continued)

*Primary Examiner* — Qing Yuan Wu
(74) *Attorney, Agent, or Firm* — Foley & Lardner LLP

(57) ABSTRACT

A model management system for building equipment includes one or more memory devices configured to store instructions that, when executed on one or more processors, cause the one or more processors to determine whether fault data exists in equipment data used to generate a plurality of shutdown prediction models for the building equipment, generate a first performance evaluation value for each of the plurality of shutdown prediction models using a first evaluation technique in response to a determination that the fault data exists in the equipment data, generate a second performance evaluation value for each of the plurality of shutdown prediction models using a second evaluation technique in response to a determination that the fault data does not exist in the equipment data, and select one of the plurality of
(Continued)

shutdown prediction models based on the first performance evaluation value and the second performance evaluation value.

20 Claims, 16 Drawing Sheets

Related U.S. Application Data continuation of application No. 16/198,456, filed on Nov. 21, 2018, now Pat. No. 11,474,485.

(60) Provisional application No. 62/685,618, filed on Jun. 15, 2018.

(51) Int. Cl.
  *F24F 11/63* (2018.01)
  *F24F 11/64* (2018.01)
  *G05B 13/02* (2006.01)
  *G06N 20/00* (2019.01)
  *G06N 5/04* (2023.01)

(52) U.S. Cl.
  CPC ......... *G05B 13/0265* (2013.01); *G05B 13/04* (2013.01); *G06N 20/00* (2019.01); *G05B 13/027* (2013.01); *G05B 13/028* (2013.01); *G06N 5/04* (2013.01)

(56) References Cited

U.S. PATENT DOCUMENTS

| | | |
|---|---|---|
| 7,827,813 B2 | 11/2010 | Seem |
| 8,311,967 B1 | 11/2012 | Lin et al. |
| 8,370,279 B1 | 2/2013 | Lin et al. |
| 8,762,299 B1 | 6/2014 | Breckenridge et al. |
| 8,843,427 B1 | 9/2014 | Lin et al. |
| 9,530,169 B2 | 12/2016 | Strelec et al. |
| 9,740,545 B2 | 8/2017 | Aisu et al. |
| 9,778,639 B2 | 10/2017 | Boettcher et al. |
| 9,866,161 B1 | 1/2018 | Johnson et al. |
| 10,001,760 B1 | 6/2018 | Hoffmann et al. |
| 10,068,176 B2 | 9/2018 | Chan et al. |
| 10,120,375 B2 | 11/2018 | Przybylski et al. |
| 10,372,567 B2 | 8/2019 | Rensing et al. |
| 10,437,858 B2 | 10/2019 | Naughton et al. |
| 10,438,303 B2 | 10/2019 | Chen et al. |
| 10,565,513 B2 | 2/2020 | Cantwell |
| 11,119,458 B2 | 9/2021 | Asp et al. |
| 2004/0059697 A1 | 3/2004 | Forman |
| 2005/0216426 A1 | 9/2005 | Weston et al. |
| 2006/0042277 A1 | 3/2006 | Sadegh et al. |
| 2006/0136462 A1 | 6/2006 | Campos et al. |
| 2006/0173559 A1 | 8/2006 | Kirshenbaum et al. |
| 2008/0077544 A1 | 3/2008 | Sureka |
| 2009/0132443 A1 | 5/2009 | Mueller et al. |
| 2009/0157584 A1 | 6/2009 | Yang et al. |
| 2009/0182696 A1 | 7/2009 | Menahem et al. |
| 2009/0204267 A1 | 8/2009 | Sustaeta et al. |
| 2009/0228409 A1 | 9/2009 | Eklund et al. |
| 2010/0023107 A1 | 1/2010 | Lee et al. |
| 2010/0174514 A1 | 7/2010 | Melkumyan et al. |
| 2010/0324741 A1 | 12/2010 | House et al. |
| 2011/0061015 A1 | 3/2011 | Drees et al. |
| 2011/0082712 A1 | 4/2011 | Eberhardt et al. |
| 2011/0178977 A1 | 7/2011 | Drees |
| 2011/0184766 A1 | 7/2011 | Virdhagriswaran |
| 2011/0293187 A1 | 12/2011 | Sarkar et al. |
| 2012/0022700 A1 | 1/2012 | Drees et al. |
| 2012/0065758 A1 | 3/2012 | Pharand et al. |
| 2012/0177260 A1 | 7/2012 | Su et al. |
| 2012/0245968 A1 | 9/2012 | Beaulieu et al. |
| 2013/0268238 A1 | 10/2013 | Mccready |
| 2014/0163936 A1 | 6/2014 | Hosking et al. |
| 2014/0188777 A1 | 7/2014 | Yan et al. |
| 2015/0081578 A1 | 3/2015 | Mclaughlin et al. |
| 2015/0120254 A1 | 4/2015 | Muraoka et al. |
| 2015/0227838 A1 | 8/2015 | Wang et al. |
| 2015/0227870 A1 | 8/2015 | Noboa et al. |
| 2015/0316907 A1 | 11/2015 | Elbsat et al. |
| 2016/0209852 A1 | 7/2016 | Beyhaghi et al. |
| 2016/0223214 A1 | 8/2016 | Turner et al. |
| 2016/0224903 A1 | 8/2016 | Talathi et al. |
| 2016/0305678 A1 | 10/2016 | Pavlovski et al. |
| 2016/0371585 A1 | 12/2016 | Mcelhinney et al. |
| 2016/0373306 A1 | 12/2016 | Saha et al. |
| 2017/0061329 A1 | 3/2017 | Kobayashi et al. |
| 2017/0083822 A1 | 3/2017 | Adendorff et al. |
| 2017/0102433 A1 | 4/2017 | Wenzel et al. |
| 2017/0103483 A1 | 4/2017 | Drees et al. |
| 2017/0104346 A1 | 4/2017 | Wenzel et al. |
| 2017/0249554 A1 | 8/2017 | Zirnstein et al. |
| 2017/0286962 A1 | 10/2017 | Lai et al. |
| 2017/0292513 A1 | 10/2017 | Haddad et al. |
| 2017/0351234 A1 | 12/2017 | Chen et al. |
| 2017/0366414 A1 | 12/2017 | Hamilton et al. |
| 2018/0046149 A1 | 2/2018 | Ahmed |
| 2018/0089389 A1 | 3/2018 | Hu et al. |
| 2018/0180314 A1 | 6/2018 | Brisette et al. |
| 2018/0203961 A1 | 7/2018 | Aisu et al. |
| 2018/0225391 A1 | 8/2018 | Sali et al. |
| 2018/0245801 A1 | 8/2018 | Schindler et al. |
| 2019/0004484 A1 | 1/2019 | Cussonneau et al. |
| 2019/0041811 A1 | 2/2019 | Drees |
| 2019/0048740 A1 | 2/2019 | Agarwal et al. |
| 2019/0072942 A1 | 3/2019 | Park et al. |
| 2019/0108417 A1 | 4/2019 | Talagala et al. |
| 2019/0122078 A1 | 4/2019 | Ura et al. |
| 2019/0138939 A1 | 5/2019 | Devaraju et al. |
| 2019/0163549 A1 | 5/2019 | Huang et al. |
| 2019/0178514 A1 | 6/2019 | Sasaki et al. |
| 2019/0188584 A1 | 6/2019 | Rao et al. |
| 2019/0236598 A1 | 8/2019 | Padmanabhan |
| 2019/0311332 A1 | 10/2019 | Turney et al. |
| 2019/0391573 A1 | 12/2019 | Wang |
| 2020/0026590 A1 | 1/2020 | Lopez et al. |
| 2020/0049363 A1 | 2/2020 | Koizumi et al. |
| 2020/0067969 A1 | 2/2020 | Abbaszadeh et al. |
| 2020/0250109 A1 | 8/2020 | Yaacov et al. |
| 2022/0268475 A1 | 8/2022 | Barnes |

OTHER PUBLICATIONS

Ke et al., "Model-Based Predictive Maintenance of Chillers," Proceedings of the 7th Asian Conference on Refrigeration and Air Conditioning, ACRA2014, Jeju, Korea, May 18-21, 2014 (4 pages).

Meel et al., "Disturbance Classification and Rejection Using Pattern Recognition Methods," Industrial & Engineering Chemistry Research, 2003, vol. 42 (pp. 3321-3333).

Mittas et al., "Ranking and Clustering Software Cost Estimation Models through a Multiple Comparisons Algorithm," IEEE Transactions on Software Engineering, Apr. 2013, vol. 39, No. 4 (15 pages).

Rao and Gao, "Influencing factors analysis and development trend prediction of population aging in Wuhan based on TTCCA and MLRA-ARIMA," Soft Computing, 2021, vol. 25 (pp. 5533-5557) Epub Jan. 15, 2021 [retrieved from https://www.ncbi.nlm.nih.gov/pmc/articles/PMC] (Year: 2021).

Susto et al., "Machine Learning for Predictive Maintenance: A Multiple Classifier Approach," IEEE Transactions on Industrial Informatics, Jun. 2015, vol. 11, No. 3 (pp. 812-820).

Yan et al., "ARX model based fault detection and diagnosis for chillers using support vector machines," Energy and Buildings, 2014, 81, (pp. 287-295).

Zhao et al., "A robust pattern recognition-based fault detection and diagnosis (FDD) method for chillers," HVAC&R Research, 2014, vol. 20 (pp. 798-809).

\* cited by examiner ial Patent Application No. 62/685,
ADAPTIVE SELECTION OF MACHINE LEARNING/DEEP LEARNING MODEL WITH OPTIMAL HYPER-PARAMETERS FOR ANOMALY DETECTION OF CONNECTED EQUIPMENT

CROSS-REFERENCE TO RELATED PATENT APPLICATIONS

This application is a continuation of U.S. patent application Ser. No. 17/963,699 filed Oct. 11, 2022 (now U.S. Pat. No. 11,747,776), which is a continuation of U.S. patent application Ser. No. 16/198,456 filed Nov. 21, 2018 (now U.S. Pat. No. 11,474,485), which claims the benefit of and priority to U.S. Provisional Patent Application No. 62/685,618 filed Jun. 15, 2018, all of which are incorporated by reference herein in their entireties.

BACKGROUND

The present disclosure relates generally to chillers operating in conjunction with HVAC systems. The present disclosure relates more particularly to predicting chiller faults using models trained with machine learning and deep learning.

Chillers are often found in buildings and are components of HVAC systems. Chillers are subject to faults, which can cause unplanned shutdowns due to safety and other concerns. More specifically, chiller shutdowns may cause loss of efficiency, as well as damage to other expensive HVAC equipment during a shutdown. It is desirable to predict chiller shutdowns prior to shutdowns occurring.

Chiller faults are often unexpected and difficult to predict. Various factors may cause a chiller fault including overuse, required maintenance, safety concerns and environmental conditions, among other possible factors. With many factors capable of influencing sudden chiller faults, predicting future chiller failure is challenging.

SUMMARY

One implementation of the present disclosure is a chiller fault prediction system for a building. The system includes one or more memory devices configured to store instructions to be executed on one or more processors. The one or more processors are configured to receive chiller data for chillers, the chiller data indicating performance of the chillers. The one or more processors are configured to generate, based on the received chiller data, single chiller prediction models and cluster chiller prediction models. The single chiller prediction models are generated for each of the chillers and the cluster chiller prediction models are generated for chiller clusters of the chillers. The one or more processors are configured to label each of the single chiller prediction models and the cluster chiller prediction models as an accurately predicting chiller model or an inaccurately predicting chiller model based on a performance of each of the single chiller prediction models and a performance of each of the cluster chiller prediction models. The one or more processors are configured to predict a chiller fault with each of the single chiller prediction models labeled as the accurately predicting chiller models. The one or more processors are configured to predict a chiller fault for each of the assigned chillers assigned to clusters labeled as the accurately predicting chiller model.

In some embodiments, the one or more processors are configured to receive an indication of a new chiller, wherein the new chiller is not associated with historical chiller data. In some embodiments, the one or more processors are configured to assign the new chiller to one of the cluster chiller prediction models labeled as the accurately predicting chiller model, receive new chiller data for the new chiller, the new chiller data indicating operation of the new chiller, and predict a chiller fault for the new chiller based on the new chiller data and one of the cluster chiller prediction models labeled as the accurately predicting chiller model to which the new chiller is assigned.

In some embodiments, the one or more processors are configured to re-evaluate chiller models labeled as accurately predicting chiller models to determine if the chiller models are to retain an accurately predicting chiller model state. In some embodiments, the one or more processors are configured to retain the accurately predicting chiller model state if the chiller model is determined operate as an accurately predicting chiller model, and switch to an inaccurately predicting chiller model state if the chiller model is determined to operate as an inaccurately predicting chiller model.

In some embodiments, the one or more processors are configured to re-evaluate chiller models labeled as inaccurately predicting chiller models to determine if the chiller models are to retain the inaccurately predicting chiller model state. In some embodiments, the one or more processors are configured to retain the inaccurately predicting chiller model state if the chiller model is determined to operate as an inaccurately predicting chiller model, and switch to the accurately predicting chiller model state if the chiller model is determined to operate as an accurately predicting chiller model.

In some embodiments, the one or more processors are configured to train the single chiller prediction models, resulting in one or more model parameters, and train the cluster chiller models with the one or more model parameters.

In some embodiments, the one or more processors are configured to form the clusters based on cluster criteria, wherein the cluster criteria include new chillers without historic chiller data, existing chillers without proper historic chiller data, or chillers for which existing single chiller prediction models are insufficient.

In some embodiments, the one or more processors are configured to receive chiller data for epochs, wherein the single chiller prediction models and the cluster chiller prediction models are generated for each of the epochs.

In some embodiments, the one or more processors are configured to assign existing chillers that are not associated with historic chiller data to one of the clusters.

In some embodiments, the one or more processors are configured to generate a fault prediction, the fault prediction indicating that the chiller will shut down at a future time.

Another implementation of the present disclosure is a method of predicting chiller faults for a building system. The method includes receiving chiller data for chillers, the chiller data indicating performance of the chillers. The method includes generating, based on the received chiller data, single chiller prediction models and cluster chiller prediction models, the single chiller prediction models generated for each of the chillers and the cluster chiller prediction models generated for chiller clusters of the chillers. The method further includes labeling each of the single chiller prediction models and the cluster chiller prediction models as an accurately predicting chiller model or an inaccurately predicting chiller model based on a performance of each of the single chiller prediction models and a performance of each of the cluster chiller prediction models. The method includes predicting a chiller fault with each of the single chiller prediction models labeled as the accurately predicting chiller models, and predicting a chiller fault for assigned chillers assigned to clusters labeled as the accurately predicting chiller model.

In some embodiments, the method further includes receiving an indication of a new chiller, wherein the new chiller is not associated with historical chiller data. In some embodiments, the method includes assigning the new chiller to one of the cluster chiller prediction models labeled as the accurately predicting chiller model. In some embodiments, the method further includes receiving new chiller data for the new chiller, the new chiller data indicating operation of the new chiller, and predicting a chiller fault for the new chiller based on the new chiller data and the cluster chiller prediction models labeled as the accurately predicting chiller model to which the new chiller is assigned.

In some embodiments, the method further includes re-evaluating chiller models labeled as accurately predicting chiller models to determine if the chiller models are to retain an accurately predicting chiller model state. In some embodiments, the method further includes retaining the accurately predicting chiller model state if the chiller model is determined to operate as an accurately predicting chiller model, and switching to an inaccurately predicting chiller model state if the chiller model is determined to operate as an inaccurately predicting chiller model.

In some embodiments, the method further includes re-evaluating chiller models labeled as inaccurately predicting chiller models to determine if the chiller models are to retain the inaccurately predicting chiller model state. In some embodiments, the method further includes retaining the inaccurately predicting chiller model state if the chiller model is determined to operate as an inaccurately predicting chiller model, and switching to the accurately predicting chiller model state if the chiller model is determined to operate as an accurately predicting chiller model.

In some embodiments, the method further includes training the single chiller prediction models, resulting in one or more model parameters, and training the cluster chiller models with the one or more model parameters.

In some embodiments, the method further includes forming the clusters based on cluster criteria, wherein the cluster criteria include new chillers without historic chiller data, existing chillers without proper historic chiller data, or chillers for which existing single chiller prediction models are insufficient.

In some embodiments, the method further includes receiving chiller data for epochs, wherein the chiller prediction models are generated for each of the epochs.

In some embodiments, the method further includes assigning existing chillers that are not associated with historic chiller data to one of the clusters.

In some embodiments, the method further includes generating a fault prediction, the fault prediction indicating that the chiller will shut down at a future time.

Another implementation of the present disclosure is a chiller fault prediction system for a building. The system includes one or more memory devices storing instructions, and one or more processors configured to execute the instructions stored on the one or more memory devices. The one or more processors are configured to receive chiller data for chillers, the chiller data indicating performance of the chillers. The one or more processors are configured to generate, based on the received chiller data, single chiller prediction models and cluster chiller prediction models, the single chiller prediction models generated for each of the chillers and the cluster chiller prediction models generated for chiller clusters of the chillers. The one or more processors are configured to label each of the single chiller prediction models and the cluster chiller prediction models as an accurately predicting chiller model or an inaccurately predicting chiller model based on a performance of each of the single chiller prediction models and a performance of each of the cluster chiller prediction models. The one or more processors are configured to predict a chiller fault with each of the single chiller prediction models labeled as the accurately predicting chiller models. The one or more processors are configured to predict a chiller fault for assigned chillers assigned to clusters labeled as the accurately predicting chiller model.

In some embodiments, the instructions stored on the one or more memory devices include training the single chiller prediction models resulting in one or more model parameters, and training the cluster chiller models with the one or more model parameters.

DETAILED DESCRIPTION

Overview

Figure 1:
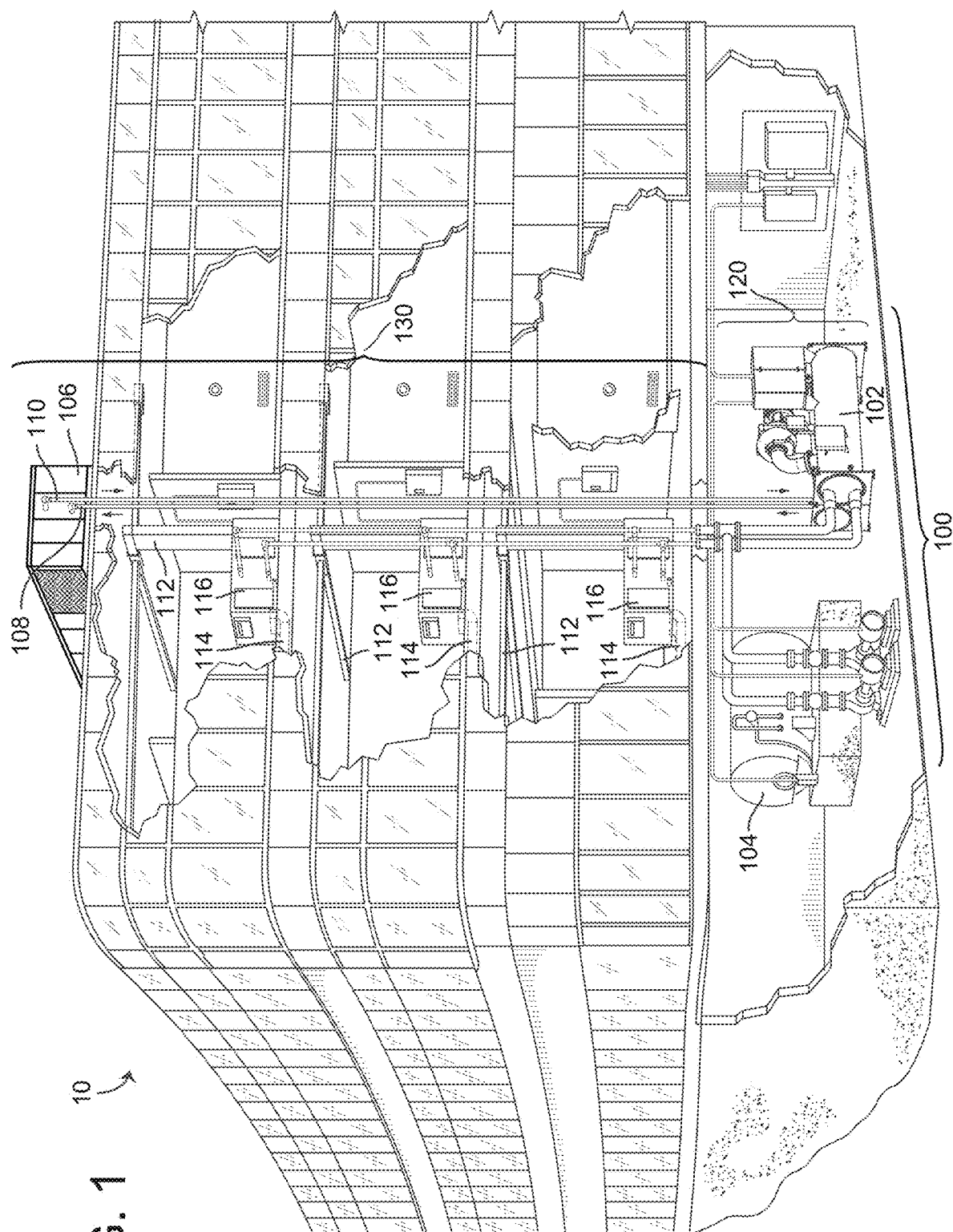
FIG. 1 is a drawing of a building equipped with a HVAC system, according to some embodiments.

Chillers are generally critical components of HVAC equipment in buildings and can consume about half of building energy consumption. As such, it is desirable to maintain chillers properly so as to ensure optimal functionality as well as ideal performance. In some instances even temporary loss of a chiller can lead to substantial losses including financial losses, losses of related HVAC equipment due to a malfunctioning or non-functioning chiller, as well as other potential losses including those associated with inefficient or incomplete operation. Such substantial losses from chiller malfunction and/or non-function such as may be experienced from a chiller shutdown present a desire for predicting chiller events such as shutdowns before they happen.

A chiller is equipped with numerous sensors capable of collecting a variety of data from chillers in real time in accordance with some embodiments. In some instances, this can aid in scheduling maintenance in advance of any unexpected chiller events, such as shutdowns. Predicting faults (events including chiller shutdowns, such as safety shutdowns) prior to occurring through analysis of chiller data can allow for preventative maintenance, thus optimizing the performance of chillers and preventing costly losses including unplanned maintenance costs and damage to expensive equipment. In order to predict chiller faults, IoT (Internet of Things) learning and deep learning accurately predict in advance (with service lead time) future faults using historic data collected by connected chiller sensors in some embodiments. For example, with regard to machine learning Multivariate Gaussian Modeling (MVG) and Graphical Gaussian Modeling (GGM) may be implemented. Deep learning techniques may include Long Short Term Memory (LSTM) with autoencoder, as well as Variational Autoencoder (VAE) methods. Ultimately, connected chiller sensors and associated connected chillers can enable the collection of chiller operation data in real time and allow for analysis thereof.

However, the use of machine learning and deep learning methods and modeling to predict chiller faults can require that the models be carefully trained to make accurate predictions. As such, historic training data is used in the training process for machine learning and deep learning models. More specifically, the quality of historic training data available and hyper-parameter tuning of machine learning and deep learning models may impact the accuracy of fault projections. Machine learning and deep learning models can be developed for each chiller (i.e., individual chillers) and/or for clustered chillers (i.e., groups of chillers). Machine learning can be trained on groups of chillers since newly commissioned chillers may not have adequate individual historic data to train machine learning and deep learning models for predictions of the individual chiller. With regard to machine learning and deep learning models, prediction accuracy can be variable and for some models may be good enough to deploy the model, in which case the model may be applied to other chillers and/or used for training purposes. In the event that machine learning and deep learning models are not good enough to be deployed, the model may be discarded with new machine learning and deep learning models generated based on newly collected data.

Machine learning and deep learning models may implement anomaly detection, which is a machine learning and deep learning technique that can identify patterns for normal states, and then compare patterns with new observations. In the event of a new pattern being observed that is significantly different, this may be classified as an anomaly, or fault in some embodiments. An anomaly detection model can capture underlying probability distributions of non-anomalous (i.e., normal) data in a space that may be different from that of anomalous data. With regard to machine learning and deep learning models, each model has a set of hyper-parameters that may be tuned to ensure model accuracy. As such, developing an effective combination of machine learning and deep learning models with correct hyper-parameters can be critical to model accuracy. Thus, multiple models may be trained using different sets of hyper-parameters, where a selection may then be made as to which combination may produce the most accurate predictions. For anomaly detection models, an anomaly threshold may be set in the underlying probability distribution to distinguish normal behavior from abnormal behavior. In some instances, this may allow for correct separation of true negative results from true positive results, for example. As such, developing anomaly detection in machine learning and deep learning models with an effective threshold may allow for models to perform optimally and output the most accurate predictions.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
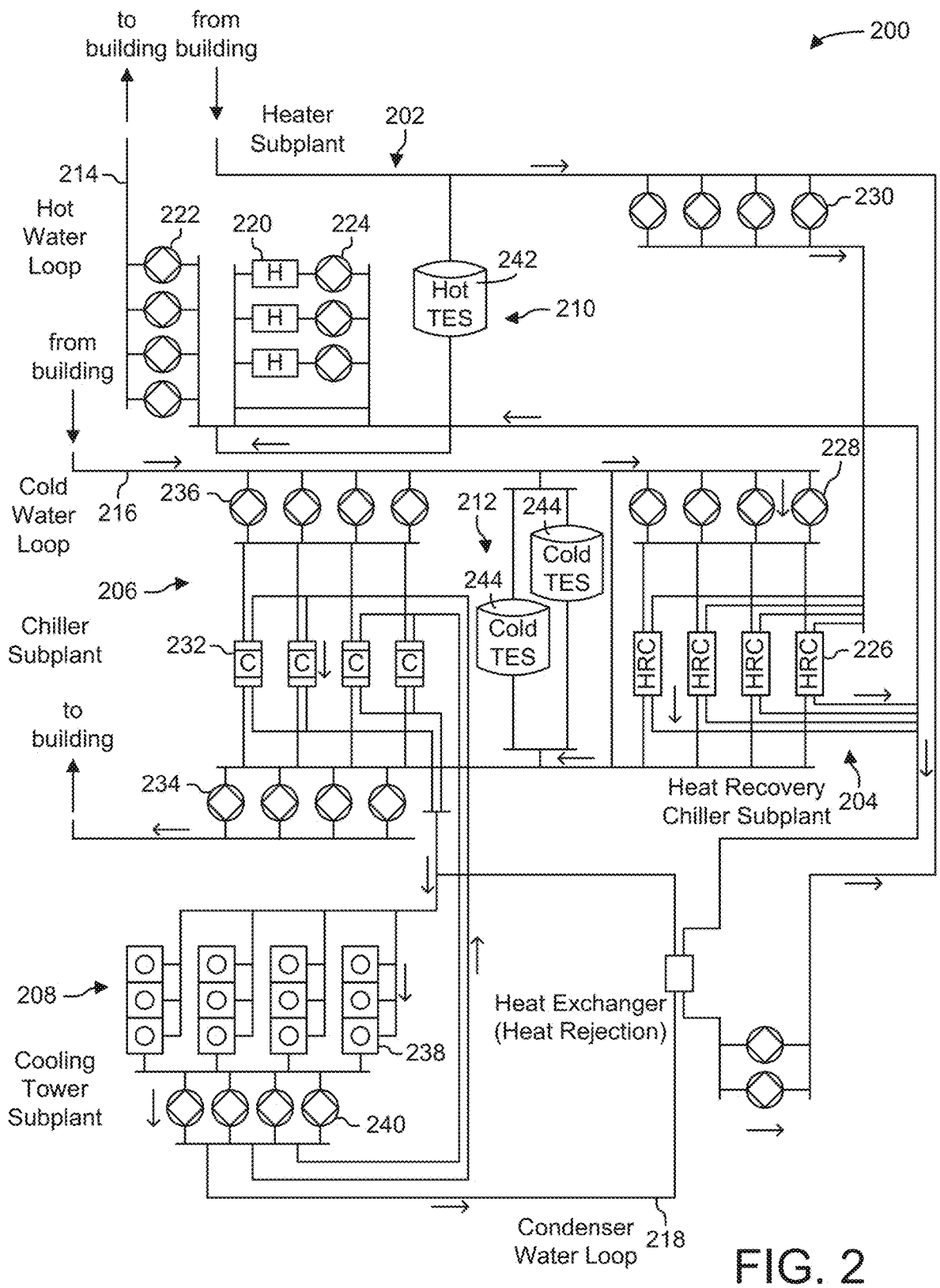
FIG. 2 is a schematic diagram of a waterside system which can be used in conjunction with the building of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
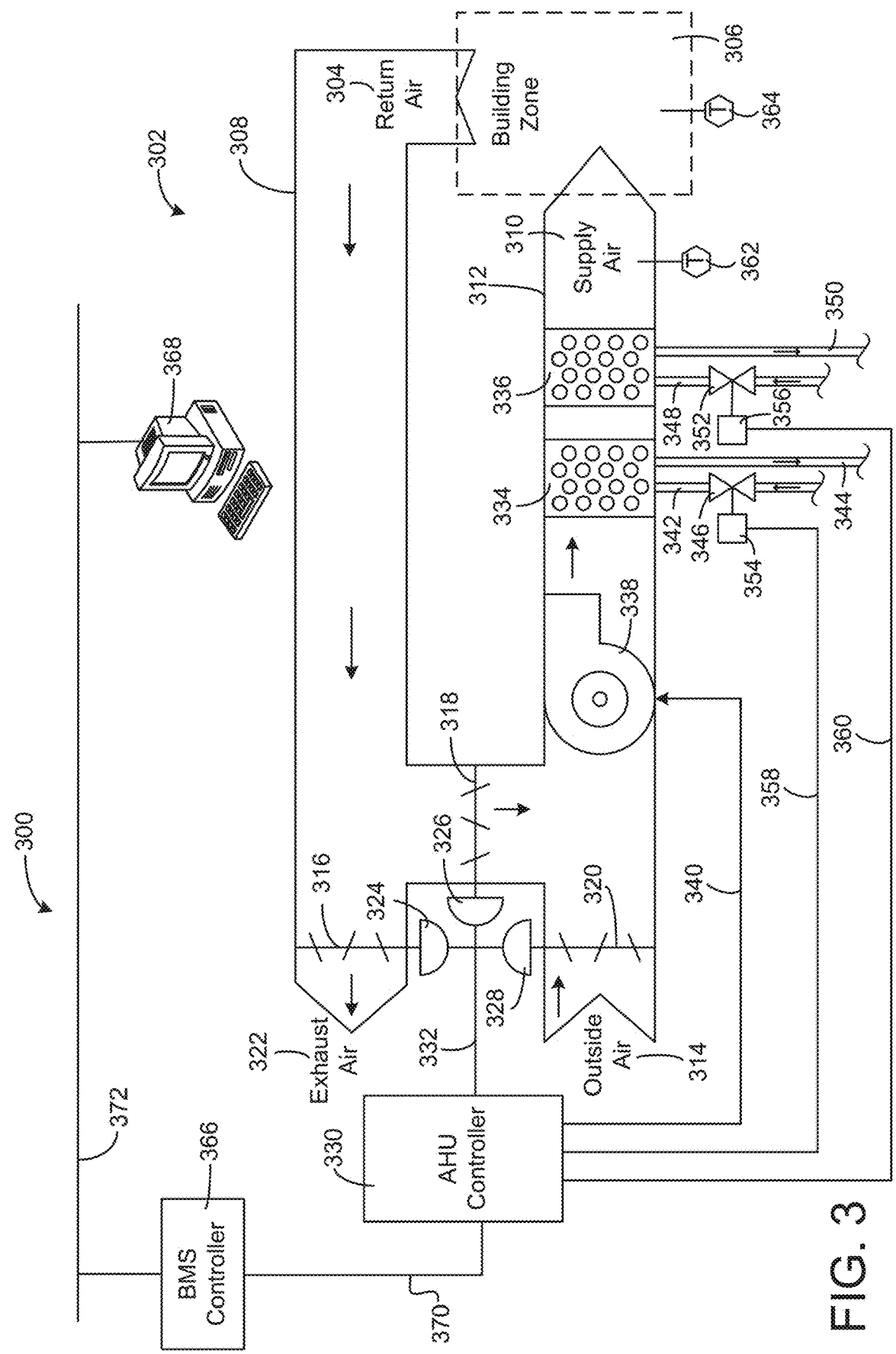
FIG. 3 is a schematic diagram of an airside system which can be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Figure 4:
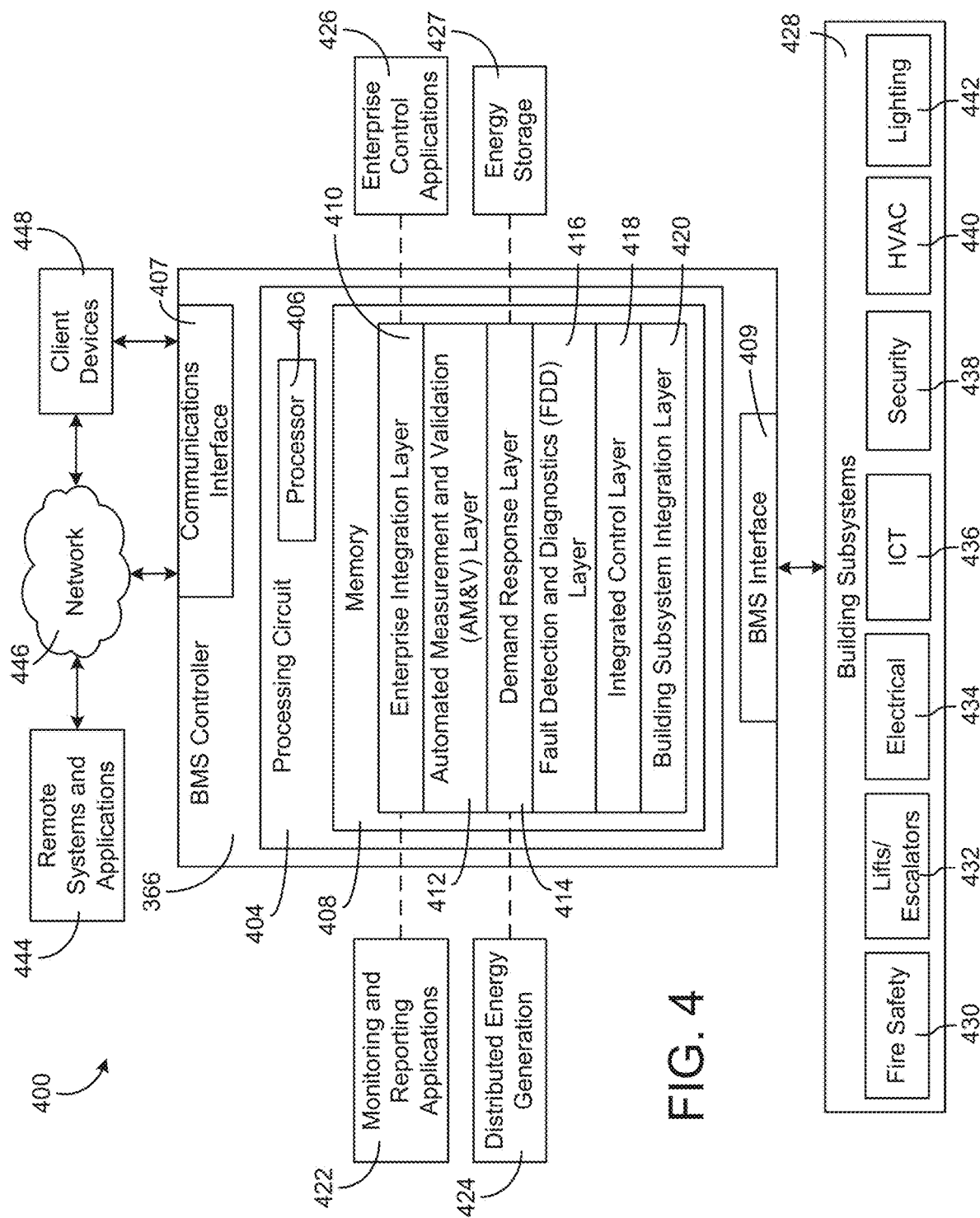
FIG. 4 is a block diagram of a building management system (BMS) which can be used to monitor and control the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In some embodiments, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
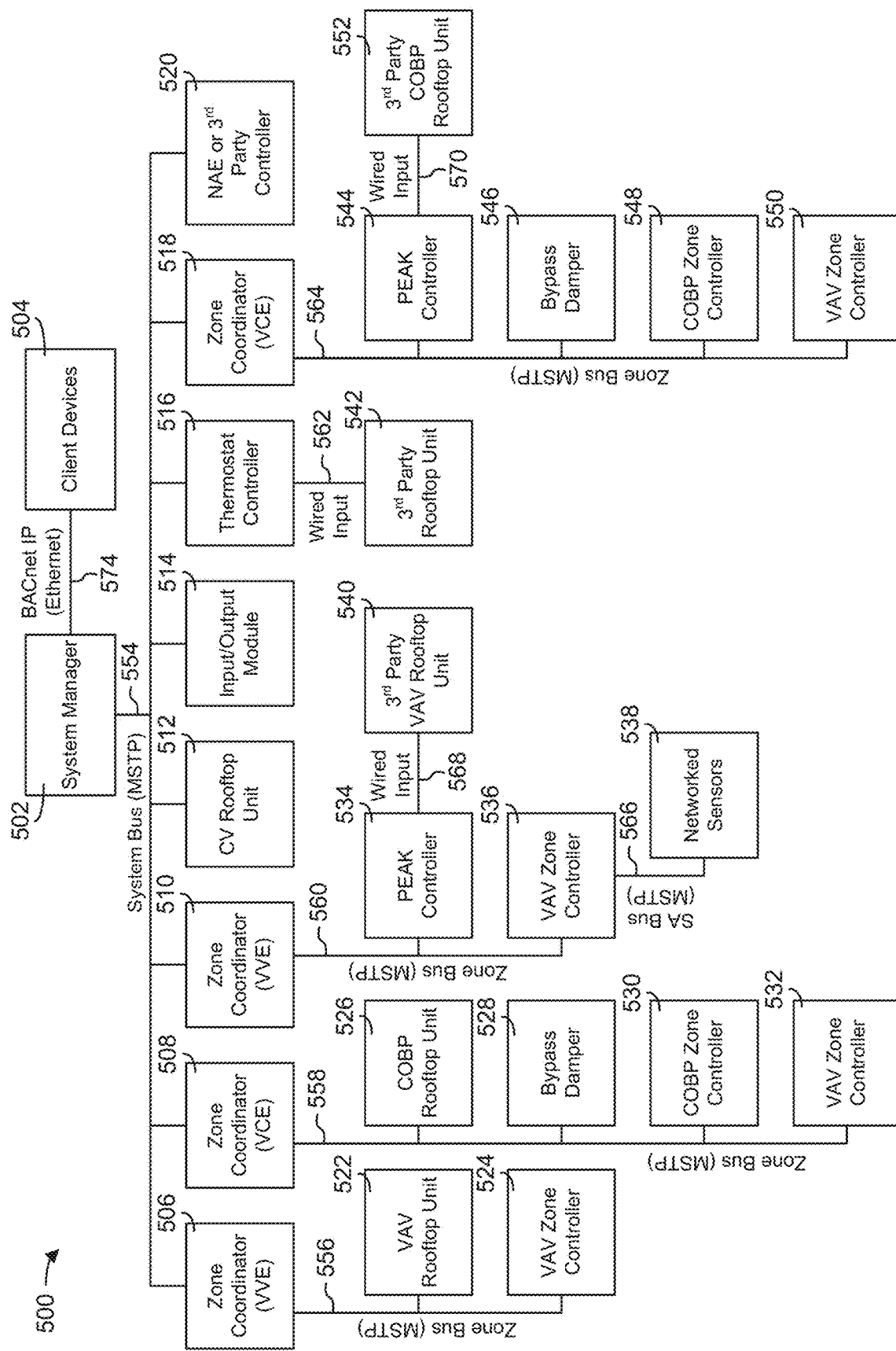
FIG. 5 is a block diagram of another BMS which can be used to monitor and control the building of FIG. 1, according to some embodiments.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., TOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 6:
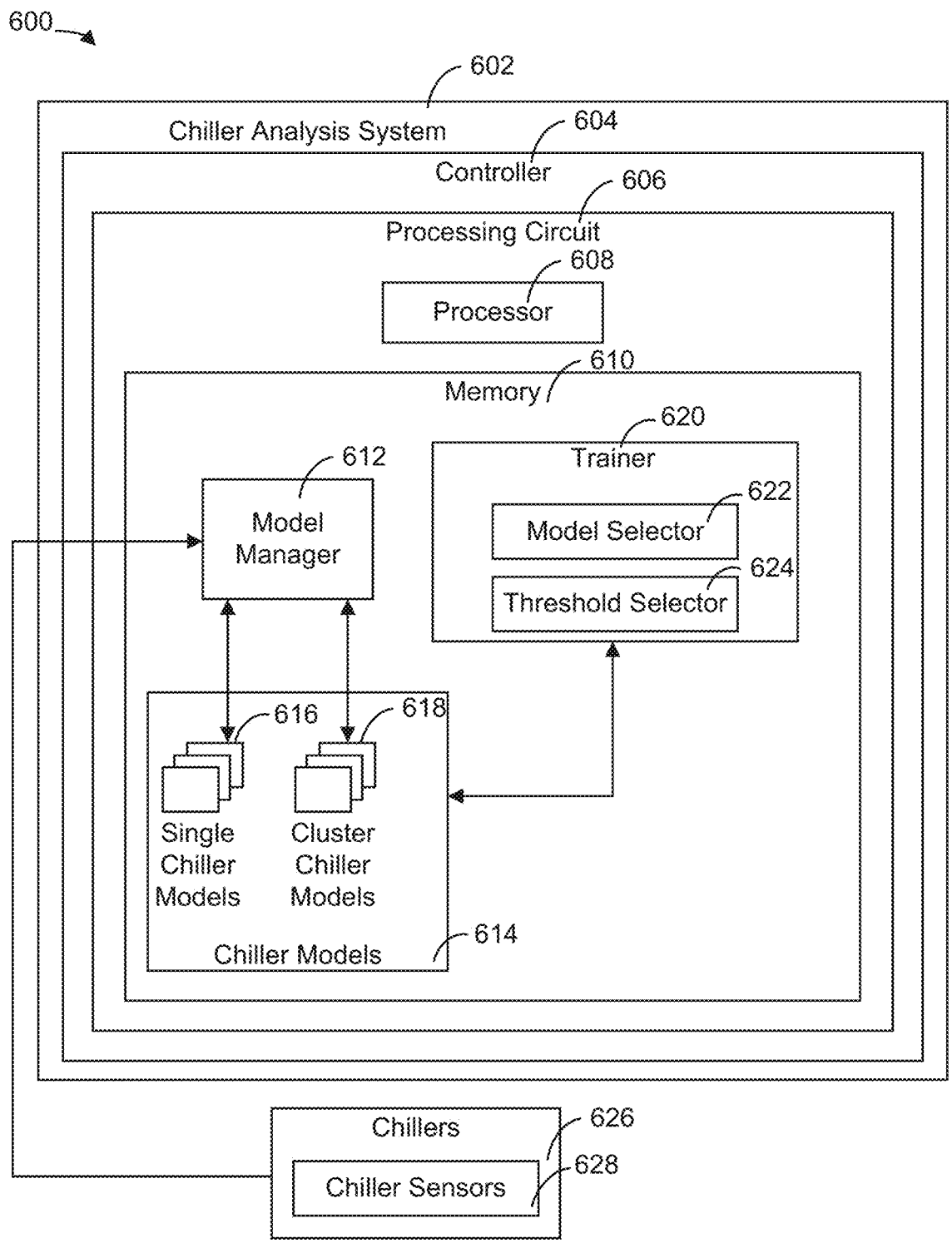
FIG. 6 is a block diagram of a chiller analysis system for generating single chiller models and cluster chiller models with a model manager and a trainer including a threshold selector and a model selector, according to an exemplary embodiment.

Adaptive Training and Deployment of Single Chiller and Clustered Chiller Fault Detection Models Referring now to FIG. 6, a system 600 is shown, according to an exemplary embodiment. The system 600 is shown to include a chiller analysis system 602 configured to generate prediction of equipment shutdowns. Chiller analysis system 602 is shown to communicate with chillers 626, which include chiller sensors 628. Chillers 626 may be one or multiple chillers, e.g., chiller 102 as described with reference to FIG. 1. Chiller sensors 628 can be positioned on, within, and/or adjacent to chillers 626, according to some embodiments. Further, chiller sensors 628 can be configured to collect a variety of data including usage time, efficiency metrics, input and output quantities, as well as other data. According to some embodiments, chiller sensors 628 can be configured to store and/or communicate collected chiller data. In some embodiments, chillers 626 can also be configured to store and/or communicate collected chiller data from chiller sensors 628. Chiller analysis system 602 can receive performance data from chillers 626 and generate fault prediction models for the chillers and utilize the fault prediction models to determine if a fault will occur in the future for chillers 626. Chiller analysis system 602 may not be limited to performing fault predictions for chillers and can also be configured to perform fault prediction for type of building equipment, e.g., air handler unit 106 as described with reference to FIG. 1, boiler 104 as described with reference to FIG. 1, etc.

Chiller analysis system 602 is shown to include a controller 604, according to some embodiments. In some embodiments, controller 604 is shown to include a processing circuit 606, a processor 608, and a memory 610. Controller 604 can include one or more computer systems (e.g., servers, supervisory controllers, subsystem controllers, etc.) that serve as system level controllers, application or data servers, head nodes, or master controllers for chiller analysis system 602. Controller 604 may communicate with multiple downstream systems or subsystems. Controller 604 can also be in communication with processing circuit 606, processor 608, and/or memory 610, according to some embodiments.

Chiller analysis system 602 is shown to include processing circuit 606 which can be included in controller 604, according to some embodiments. Processing circuit 606 is shown to include processor 608 and memory 610 in some embodiments. Processing circuit 606 can allow and enable communication between controller 604 and memory 610, as well as other possible components that may be included in some embodiments. Processor 608 can be implemented as a general-purpose processor, an application specific integrated circuit (ASIC), one or more field programmable gate arrays (FPGAs), a group of processing components, or other suitable electronic processing components.

Chiller analysis system 602 is shown to include memory 610, according to some embodiments. Memory 610 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 610 can be or include volatile memory or non-volatile memory. Memory 610 can include database components, object code components, script components, or any other type of information structure for supporting the various activities and information structures described in the present application. According to some embodiments, memory 610 is communicably connected to processor 608 via processing circuit 606 and includes computer code for executing (e.g., by processing circuit 606 and/or processor 608) one or more processes described herein.

Memory 610 is shown to include a model manager 612, a trainer 620, and chiller models 614. Model manager 612 can be configured to manage chiller models 614. Chiller models 614 are shown to include multiple single chiller models 616 and multiple cluster chiller models 618. Model manager 612 can be configured to manage single chiller models 616 and/or cluster chiller models 618. Chiller analysis system 602 may also vary according to desired preferences and specifications of a user and/or operator, according to some embodiments. For example, in some embodiments chiller analysis system 602 may be configured to perform certain tasks and functions periodically, with the intervals for which periodic tasks and functions are performed variable according to embodiment and user preferences. Further, some embodiments may be configured to accommodate a user and/or operator who desires various evaluations, analyses and re-training of models more frequently (i.e. shorter intervals) than another user and/or operator. As such, chiller analysis system 602 may be configured differently according to embodiment in order to perform a variety of functions with many configurations variable according to user and/or operator specifications, depending on the embodiment.

Model manager 612 is shown to be in communication with single chiller models 616 as well as cluster chiller models 618, according to some embodiments. Model manager 612 may be configured to manage single chiller models 616 and cluster chiller models 618 at the same time, according to some embodiments. Further, model manager 612 may also be configured to perform certain analyses and evaluations for single chiller models 616 and cluster chiller models 618. For example, model manager 612 may be configured to—by means of user and/or operator preference, or other circumstance—periodically evaluate single chiller models 616 and/or cluster chiller models 618, according to some embodiments. Additionally, model manager 612 may also be configured to make determinations as to the result of certain analyses and/or evaluations that may be performed with relation to single chiller models 616 and cluster models 618, according to some embodiments. For example, upon completion of an evaluation of single chiller models 616 and/or cluster chiller models 618, model manager 612 may determine if one or more of single chiller models 616 and/or cluster chiller models 618 may require modification, maintenance, and/or any other attention, according to some embodiments.

Chiller models 614 is shown to include single chiller models 616 and cluster chiller models 618, according to some embodiments. Single chiller models 616 and cluster chiller models 618 are shown to be in communication with model manager 612, as seen in some embodiments. Single chiller models 616 and cluster chiller models 618 can relate to chillers 626 and/or other similar components, according to some embodiments. Additionally, single chiller models 616 and cluster chiller models 618 can be built using data collected chillers 626. Both single chiller models 616 and cluster chiller models 618 may be present within chiller models 614. Further, chiller models 614 can also contain solely single chiller models 616 or solely cluster models 618, according to some embodiments. Chiller models 614 can be in communication with model manager 612. Further, chiller models 614 can communicate single chiller models 616 and/or cluster chiller models 618 to model manager 612 in some embodiments. Such communication of single chiller models 616 and/or cluster chiller models 618 may be scheduled, determined according to specific events that may occur, initiated by a user and/or operator, or a variety of other options, according to some embodiments.

Memory 610 is also shown to include trainer 620, according to some embodiments. Trainer 620 is shown to be in communication with chiller models 614, which can include single chiller models 616 and/or cluster chiller models 618, according to some embodiments. As such, communication between trainer 620 and chiller models 614 can include the communication of single chiller models 616 and/or cluster chiller models 618, according to some embodiments. Further, trainer 620 is shown to include a model selector 622 and a threshold selector 624, according to some embodiments. Model selector 622 and threshold selector 624 can be in communication with chiller models 614, as model selector 622 and threshold selector 624 are components configured within trainer 620, which can communicate with chiller models 614. Further, model selector 622 and threshold selector 624 can perform operations on single chiller models 616 and/or cluster chiller models 618, according to some embodiments and user and/or operator preference.

Model selector 622 can perform operations involving single chiller models 616 and/or cluster chiller models 618, according to some embodiments. For example, in some embodiments trainer 620 may receive single chiller models 616 and/or cluster chiller models 618. Model selector 622 may subsequently evaluate, analyze, or perform other similar operations on and relating to single chiller models 616 and/or cluster chiller models 618 received by trainer 620. Model selector can also be configured to evaluate and/or otherwise analyze single chiller models 616 and/or cluster chiller models 618 according to various desired parameters and/or specifications. For example, the methods and techniques implemented by model selector 622 may vary based on the source and/or contents of single chiller models 616 and/or cluster chiller models 618. Further, model selector 622 can be configured to operate differently according to user and/or operator specifications. For example, model selector 622 can be configured to select models from single chiller models 616 and/or cluster chiller models 618 that prioritize factors, parameters or variables desired by a user and/or operator such as efficiency, input or output quantities, as well as other possible factors.

Threshold selector 624 can perform operations on both single chiller models 616 as well as cluster chiller models 618, according to some embodiments. As a component of trainer 620 which is shown to be in communication with single chiller models 614, threshold selector 624 can communicate with single chiller models 616 and cluster chiller models 618, which are components of chiller models 614. In some embodiments, threshold selector 624 is configured to evaluate single chiller models 616 and/or cluster chiller models 618 and, through the implementation of one or more analysis techniques, select a desirable threshold for each corresponding model of single chiller models 616 and/or cluster chiller models 618. The selection process of threshold selector 624 can in some embodiments include obtaining an operating point, which can incorporate user and/or operator preference. Further, threshold selector 624 can be configured to perform operations on, analyze and otherwise interact with single chiller models 616 and/or cluster chiller models 618 in various ways in order to select a threshold for one or more models. Additionally, threshold selector can be configured to operate the same or differently with regard to single chiller models 616 and cluster chiller models 618. Threshold selector 624 can also be configured to implement different analysis techniques and/or other operations in the selection of thresholds for single chiller models 616 than for cluster chiller models 618. For example, in some embodiments threshold selector 624 may be configured to incorporate user and/or operator preferences, such as a desire to optimize specific metrics, parameters and functions, differently than in some embodiments. Further, in the instance that a user and/or operator desired a threshold that optimized efficiency, threshold selector 624 can be configured to accommodate such a desire.

Single Chiller and Cluster Chiller Fault Detection Modeling

Figure 7A:
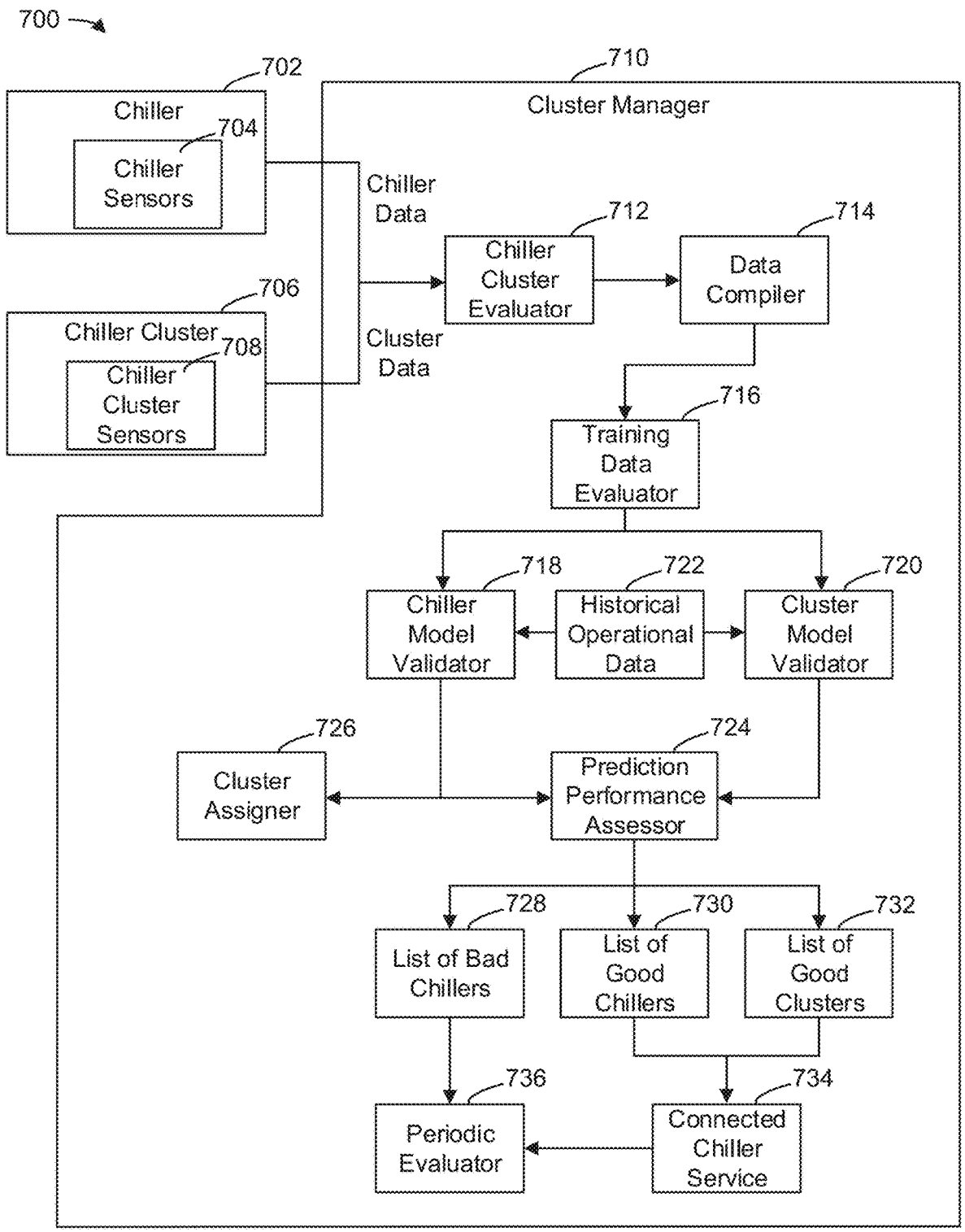
FIG. 7A is a block diagram of the model manager illustrated in FIG. 6 shown in greater detail, according to an exemplary embodiment.

Referring now to FIG. 7A, a system for model management 700 is shown. System 700 is shown to include a chiller 702 and chiller sensors 704, as well as a chiller cluster 706 which includes chiller cluster sensors 708. Chiller 702 and chiller cluster 706 can be the same and/or similar to chiller 626*s*, which is described in reference to FIG. 6. Similarly, both chiller sensors 704 and chiller cluster sensors 708 can be the same and/or similar to chiller sensors 628 which are described in reference to FIG. 6.

Chiller 702 and chiller cluster 706 are shown to communicate chiller data and cluster data, respectively, to a cluster manager 710. In some embodiments, chiller data communicated to cluster manager 710 may include data collected from and processed by chiller sensors 704. Chiller data may also pertain to chiller 702 as a whole, may be directed at a specific component of chiller 702, and/or may relate to other systems that may be working in conjunction with chiller 702. Similar to the chiller data communicated by chiller 702, cluster data communicated by chiller cluster 706 may include data collected by chiller cluster sensors 708. Cluster data may include data collected from and processed by chiller cluster sensors 708, and may correspond to components of one or more chillers, individual chillers, and/or chiller cluster 706 as a whole. Both chiller data and cluster data communicated to cluster manager 710 may vary according to some embodiments. For example, chiller data and cluster data communicated to cluster manager 710 may include input and/or output quantities, efficiency metrics, and/or past data for chiller 702 and/or chiller cluster 706, according to some embodiments.

Model manager 710 can receive both chiller data and cluster data from chiller 702 and chiller cluster 706 and the corresponding chiller sensors 704 and chiller cluster sensors 708. Model manager 710 can generate models through various means upon receiving chiller data and cluster data. Further, model manager 710 can be configured to be in communication with more components than chiller 702 and chiller cluster 706. In some embodiments, model manager 710 can be in communication with a plurality of equipment similar to chiller 702 and/or may also be in communication with a plurality of equipment clusters similar to chiller cluster 706. Model manager 710 can be configured to evaluate received chiller data and/or cluster data and evaluate and compile said data accordingly. For example, model manager 710 can be configured to sort and subsequently compile chiller data from cluster data in some embodiments or can also be configured to sort received data according to other variables such as data contents, time period, and data source, among other variables. Upon compiling chiller data and cluster data, model manager 710 can be configured to analyze, sort, and otherwise process the received data in a variety of ways. For example, model manager 710 may analyze received chiller data differently that received chiller cluster data. Additionally, model manager 710 can be configured to validate received data. In some embodiments, model manager 710 can generate models for chiller data and cluster data using the same or similar methods and techniques, while in some embodiments the methods and techniques for generating chiller models may be different than those for generating cluster models. Model manager 710 can also assess performance of the designated models, which can be a process that can be performed the same for chiller and/or cluster models or can be performed using different methods. In some embodiments, chiller models may be assessed, and upon completion of assessment, can be assigned to a cluster. Further, cluster models can also be assessed in some embodiments. Model manager 710 can label both chillers and clusters as good chillers, bad chillers, or good clusters, according to some embodiments. Good chillers can also be considered accurately predicting chillers, and good models can also be considered accurately predicting models, as models generated by such chillers can produce accurate predictions, according to some embodiments. In some embodiments, good chillers (or accurately predicting chillers) can produce data used in the generation of good chiller models (or accurately predicting chiller models). Similarly, good clusters can, in some embodiments, include clusters of which collected data can be used to generate models that can accurately predict future activity of chillers and/or clusters. Good clusters can also be considered accurately predicting clusters and good cluster models can also be considered accurately predicting cluster models. Additionally, bad chillers can include chillers of which collected data cannot be used to generate models that can accurately predict future chiller activity. Bad chillers can also be considered fault chillers, as models generated by such chillers may not perform without fault. Model manager 710 can then deploy models that have been determined to perform sufficiently, with all models also being re-evaluated periodically. Model manager can be configured to accommodate user and/or operator preferences, such as optimizing specific parameters such as efficiency or output, among other parameters.

Model manager 710 is shown to include a chiller cluster evaluator 712. Chiller cluster evaluator 712 is shown to be in communication with chiller 702 and chiller cluster 706, and receive chiller data and cluster data, respectively. Chiller cluster evaluator 712 may be in communication with a plurality of equipment similar to chiller 702 and/or a plurality of equipment clusters similar to chiller cluster 706 in some embodiments. Chiller cluster evaluator 712 may perform a variety of functions in some embodiments. For example, chiller cluster evaluator 712 may evaluate inputted data from chiller 702 and/or chiller cluster 706 and determine which data corresponds to chiller 702 and/or similar, and which data corresponds to chiller cluster 706 and/or similar, among other functions. Chiller cluster evaluator 712 may perform other functions that evaluate data based on origin in some embodiments. For example, chiller cluster evaluator 712 may evaluate inputted chiller data and chiller cluster data in order to evaluate other variables associated with inputted data, such as geographic location and time, among other possible variables. Chiller cluster evaluator 712 may also evaluate chiller data and chiller cluster data in order to store, sort, and/or otherwise process said data in order to prepare the data for further evaluation and analysis. Additionally, chiller cluster evaluator 712 is shown to be in communication with a data compiler 714, according to some embodiments. Communication between chiller cluster evaluator 712 and data compiler 714 can include, for example, sorted data from both chiller 702 and chiller cluster 706 and/or other similar components.

Model manager 710 is shown to include data compiler 714. Data compiler 714 is shown to be in communication with chiller cluster evaluator 712, as well as a training data evaluator 716, according to some embodiments. Data compiler 714 can compile data communicated to and evaluated by chiller cluster evaluator 712 that can be received from chiller 702 and/or chiller cluster 706, according to some embodiments. Data compiler 714 can also prepare data that may include chiller data and cluster data outputted by chiller 702 and chiller cluster 706 for analysis by training data evaluator 716. For example, in some embodiments data compiler 714 can compile data from chiller 702 and chiller cluster 706 differently and/or separately in order to facilitate evaluation of said data by training data evaluator 716. Additionally, data compiler 714 can compile data from multiple sources. For example, data compiler 714 may compile data from chiller 702, as well as other equipment that may be similar to chiller 702, and/or may also compile data from chiller cluster 706 as well as other equipment clusters that may be similar to chiller cluster 706, according to some embodiments.

Model manager 710 is shown to include training data evaluator 716, according to an. Training data evaluator 716 is shown to be in communication with data compiler 714, as well as a chiller model validator 718 and a cluster model validator 720, according to some embodiments. In some embodiments, training data evaluator 716 can receive an input from data compiler 714. Data compiler 714 can input data that has been collected and compiled from chiller 702 and/or other similar equipment, as well as data that may have been collected and compiled from chiller cluster 706 and/or other similar equipment clusters. Training data evaluator 716 can evaluate data inputted from data compiler 714 in a variety of ways. For example, training data evaluator 716 can determine which data received form data compiler 714 corresponds to chiller 702 and/or other similar equipment, and which data corresponds to chiller cluster 706 and/or similar equipment clusters. Training data evaluator 716 can also prepare data received from data compiler 714 to be communicated to chiller model validator 718 and chiller model validator 720, according to some embodiments. For example, training data evaluator 716 can evaluate data received from data compiler 714 in order to prepare data initially collected by chiller 702 and/or other similar equipment to be communicated to chiller model validator 718 and can also prepare data initially collected by chiller cluster 706 and/or other similar equipment clusters to be communicated to cluster model validator 720, according to some embodiments.

Model manager 710 is shown to include chiller model validator 718 and cluster model validator 720, according to some embodiments. Additionally, both chiller model validator 718 and cluster model validator 720 can be in communication with and receive an input from training data evaluator 716 and can also be in communication with historical operational data 722. Chiller model validator 718 and cluster model validator 720 can operate in a variety of ways. For example, chiller model validator 718 can receive data from training data evaluator 716 that has been evaluated and determined to have originated from chiller 702 and/or other similar equipment. Chiller model validator 718 can then compare data from chiller 702 and/or other similar equipment to historical operational data 722, which may include data previously collected from chiller 702 and/or other similar equipment. Chiller model validator 718 can then determine the validity of data received from training data evaluator 716, which may include determining if said data received from training data evaluator 716 accurately represents activity of chiller 702 and/or other similar equipment. Similarly, cluster model validator 720 can receive data from training data evaluator 716 that has been evaluated and determined to have originated from chiller cluster 706 and/or other similar equipment clusters. Cluster model validator 720 can then compare data from chiller cluster 706 and/or other similar equipment clusters to historical operational data 722, which can include data previously collected from chiller cluster 706 and/or other similar equipment clusters. In some embodiments, cluster model validator 720 can then determine the validity of data received from training data evaluator 716, which can include determining if said data received from training data evaluator 716 accurately represents activity of chiller cluster 706 and/or other similar equipment clusters. It should also be noted that chiller model validator 718 may receive data from training data evaluator 716 that may originate from chiller 702 and/or a plurality of similar equipment, and cluster model validator 720 may similarly receive training data from training data evaluator 716 that may originate from chiller cluster 706 and/or a plurality of similar equipment clusters, according to some embodiments. It should also be noted that historical operational data 722 can include data originating from chiller 702 and/or a plurality of other similar equipment and can also include data originating from chiller cluster 706 and/or a plurality of other similar equipment clusters. Historical operational data 722 can vary in some embodiments, and parameters of historical operational data 722 including quantity and time period can also vary according to some embodiments.

Model manager 710 is shown to include a prediction performance assessor 724, according to some embodiments. Prediction performance assessor 724 is shown to be in communication with chiller model validator 718 as well as cluster model validator 720, according to some embodiments. Prediction performance assessor 724 can receive an input from both chiller model validator 718 as well as cluster model validator 720. Prediction performance assessor 724 can also assess the ability of the chiller data and cluster data validated by chiller model validator 718 and cluster model validator 720 to predict events that may occur for chiller 702 and/or other similar equipment, as well as chiller cluster 706 and/or other similar equipment clusters. For example, some chiller data may be validated by chiller model validator 718, which may indicate that the data and corresponding model is a valid representation of normal activity of chiller 702 and/or other similar equipment. Prediction performance assessor 724 may then assess the ability of the data and the corresponding (now validated) model to predict various events known to occur with chiller 702 and/or other similar equipment. In some embodiments, it may be advantageous to predict a shutdown of chiller 702 and/or other similar equipment prior to the shutdown occurring, in which case prediction performance assessor 724 may assess the validated data and corresponding for the ability to accurately predict a shutdown of chiller 702 and/or other similar equipment. Prediction performance assessor 724 can also perform similar assessment functions for data and corresponding models received from cluster model validator 720 and assess the ability of said data and models to predict events in chiller cluster 706 and/or other similar equipment clusters, such as shutdowns.

Model manager 710 is shown to include a cluster assigner 726. Cluster assigner 726 is shown to be in communication with prediction performance assessor 724, according to some embodiments. Additionally, chiller model validator 718 is also shown to be in communication with cluster assigner 726, according to some embodiments. Cluster assigner 726 can operate so as to assign single chillers, which may include chiller 702 and/or other similar equipment, to a cluster such as chiller cluster 706 and/or other similar equipment cluster. For example, in the event that chiller model validator 718 determines that data and the corresponding model for a chiller such as chiller 702 and/or other similar equipment in invalid, said chiller can be assigned by cluster assigner 726 to a cluster such as chiller cluster 706 and/or other similar equipment clusters. The assignment of said chiller to a cluster by cluster assigner 726 may allow for the chiller to operate as a part of a cluster such as cluster 706 and/or other similar equipment clusters and thus become integrated with a validated cluster model of the assigned cluster. Cluster assigner 726 can also assign a chiller such as chiller 702 and/or other similar equipment to a plurality of clusters such as chiller cluster 706 and/or other similar equipment clusters.

Model manager 710 is shown to include a list of bad chillers 728, a list of good chillers 730, and a list of good clusters 732. It should be noted that, in some embodiments, good chillers and good clusters such as those of list of good chillers 730 and list of good clusters 732 can be referred to as accurately predicting chillers, accurately predicting clusters, normal chillers, and normal clusters, which is to say that accurately predicting chillers and accurately predicting clusters can be synonymous to good chillers and good clusters. Further, accurately predicting chillers and accurately predicting clusters can also correspond to the generation of accurately predicting models, according to some embodiments. It should also be noted that good chillers and good clusters can also be referred to as non-fault chillers and non-fault clusters, according to some embodiments. Similarly, it should be noted that, in some embodiments, bad chillers such as those of list of bad chillers 728 can be referred to as inaccurately predicting chillers and abnormal chillers, which is to say that inaccurately predicting chillers and abnormal chillers can be synonymous to bad chillers. It should also be noted that inaccurately predicting chillers can also be referred to as fault chillers, according to some embodiments. Further, inaccurately predicting chillers can correspond to the generation of inaccurately predicting models, according to some embodiments. List of bad chillers 728, list of good chillers 730, and list of good clusters 732 are also shown to be in communication with prediction performance assessor 724, according to some embodiments. List of bad chillers 728 can correspond to a list of chillers, such as chiller 702 and/or other similar equipment, that has been determined to fail to meet established criteria. For example, if the data collected from a chiller such as chiller 702 and/or other similar equipment is deficient in that it does not accurately represent behavior of the chiller and/or is unable to aid in predicting future events of said chiller, then that chiller may be added to list of bad chillers 728, according to some embodiments. List of bad chillers 728 can include a plurality of chillers such as chiller 702 and/or other similar equipment and can also be dynamic in that chillers may be added and removed from the list periodically. List of good chillers 730 can also be in communication with prediction performance assessor 724, according to some embodiments. A chiller such as chiller 702 and/or other similar equipment may be added to list of good chillers 730 because the chiller may provide sufficient data that accurately represents the behavior of the chiller and/or it may aid in the prediction of future events of said chiller and/or other similar chillers. For example, if a chiller such as chiller 702 and/or other similar equipment may produce data indicative of normal behavior of the chiller that may contribute to efforts to predict chiller events such as possible future shutdowns, said chiller may be added to list of good chillers 728. Similar to list of bad chillers 728, list of good chillers 730 is dynamic in that chillers can be added and/or removed depending on circumstances and embodiments. List of good clusters 732 is also shown to be in communication with prediction performance assessor 724, according to some embodiments. A cluster such as chiller cluster 706 and/or other similar equipment cluster may be added to list of good clusters 732 because the cluster can provide sufficient data that accurately represents the behavior of the cluster and/or it may aid in the prediction of future events of said cluster and/or other similar clusters. Similar to both list of bad chillers 728 and list of good chillers 730, list of good clusters 732 is dynamic in that clusters may be added and/or removed according to some embodiments.

Model manager 710 is shown to include a connected chiller service 734. Connected chiller service 734 is shown to be in communication with list of good chillers 730 as well as list of good clusters 734, according to some embodiments. Connected chiller service 734 can include all chillers and clusters that have been assessed by prediction performance assessor 724, and subsequently added to list of good chillers 730 and list of good clusters 732, according to some embodiments. Connected chiller service 734 can be connected to a plurality of chillers and clusters such as chiller 702 and chiller cluster 706, respectively, with the connected chillers and clusters potentially being in a plurality of locations. Connected chiller service 734 can also compile data and corresponding models for both chillers and clusters that have been validated by chiller model validator 718 and cluster model 720, respectively. Data and models compiled by connected chiller service 734 can include models for specific chillers and/or clusters of which the performance has been assessed by prediction performance assessor 724, according to some embodiments. Assessed data and models of connected chiller service 734 may be assessed for the ability to predict possible future events of chillers and/or clusters, such as shutdowns. Connected chiller service 734 can also include data and models that have been assessed and determined to be good models for specific chillers and/or clusters, as well as data and models that may have been assessed and determined to be good models for general chillers and/or clusters.

Model manager 710 is shown to include a periodic evaluator 736. Periodic evaluator 736 is shown to be in communication with list of bad chillers 728, as well as connected chiller service 734, according to some embodiments. Periodic evaluator 736 can perform a number of functions, which can depend on the chiller and/or cluster and the corresponding model and data to be evaluated. For example, periodic evaluator 736 can evaluate a specific set of chiller data and the corresponding model for the ability to accurately predict events of one or more chillers, such as a shutdown. Periodic evaluator 736 can also incorporate other operational data into such an evaluation, such as data from previous shutdowns as well as other available chiller operational data. Periodic evaluator 736 can also contribute to the dynamic nature of list of bad chillers 728, list of good chillers 730, and list of good clusters 732, according to some embodiments. For example, if periodic evaluator 736 is configured to evaluate chiller and/or cluster models on a monthly basis, such evaluations may account for operational data for relevant chillers and clusters that has been collected since the most recent period evaluation. As such, periodic evaluator 736 can determine that data and the corresponding model collected from a previously good chiller has not recently been effective in predicting future events of that chiller and/or similar chillers and may reassign such a chiller to list of bad chillers 728. Similarly, a chiller with data and a corresponding model that was previously ineffective in predicting future events of said chiller and/or other chillers may now produce new data and a new corresponding model that is now effective in predicating future events of the chiller and/or other chillers, with said chiller being reassigned by periodic evaluator 736 to list of good chillers 730. It should also be noted that periodic evaluator 736 can evaluate chillers and clusters based on a number of different parameters, as well as based on chiller data and cluster data collected from chiller sensors 704 of chiller 702 and chiller cluster sensors 708 of chiller cluster 706, according to some embodiments. Such parameters that may be evaluated by periodic evaluator 736 can include input and output quantities, consumption quantities, efficiency metrics, as well as other possible parameters that may indicate performance and activity of chillers and clusters such as chiller 702 and chiller cluster 706.

Figure 7B:
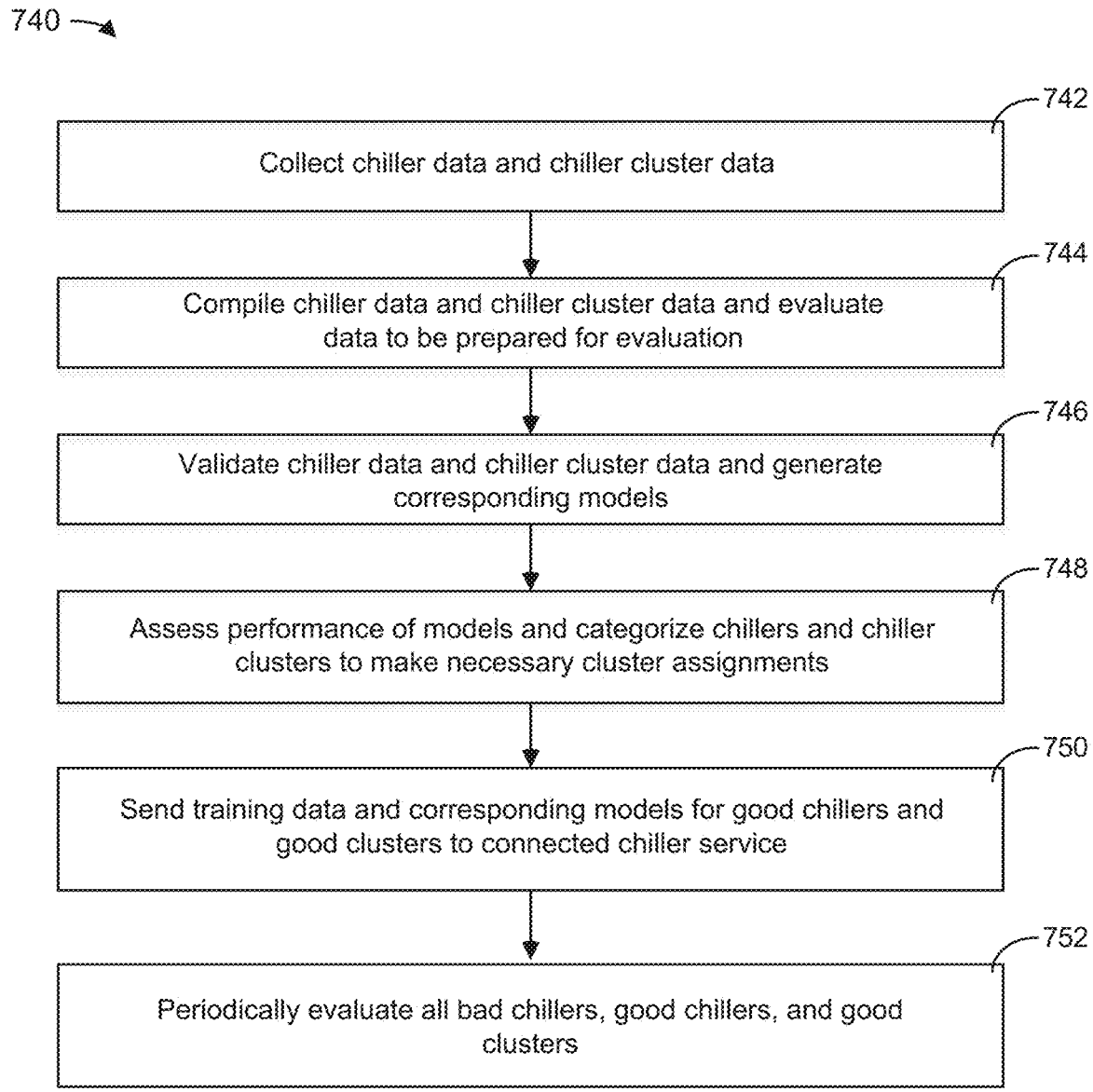
FIG. 7B is a flow diagram of a process of generating the single chiller models and the cluster chiller models illustrated in FIG. 6 that can be performed by the model manager illustrated in FIG. 7A, according to an exemplary embodiment.

Referring now to FIG. 7B, a process 740 of chiller evaluation is shown. Steps of process 740 may be performed by some and/or all of the components of FIG. 7A, which shows system 700. Process 740 can be applied to a single chiller and/or piece of equipment, such as chiller 702, and/or multiple pieces of equipment similar to and/or thereof. Similarly, process 740 can also be performed for a chiller cluster and/or equipment cluster, such as chiller cluster 706 of FIG. 7A, and/or multiple equipment clusters similar to and/or thereof. It should be noted that process 740 may include additional steps, different steps, or otherwise modified steps from those seen in the process 740 in FIG. 7B.

In step 742, chiller sensors 704 and chiller cluster sensors 708 collect chiller data and chiller cluster data, respectively. Additionally, step 742 may include both chiller data and chiller cluster data, only chiller data, or only cluster data, according to some embodiments. Data collected in step 742 may also vary, but may include input and output quantities, consumption quantities, and efficiency metrics, as well as other possible data. Collected data of step 742 can also be evaluated by a component the same as or similar to chiller cluster evaluator 712 in some embodiments. Chiller cluster evaluator 712 can serve to sort and otherwise organize data, as well as perform other functions in some embodiments.

In step 744, process 740 compiles the chiller data and the chiller cluster data of step 742 to be prepared for validation. Compilation of chiller data and chiller cluster data in step 744 can be performed by data compiler 714 of FIG. 7A and/or a similar component, according to some embodiments. Additionally, similar to step 742, step 744 can include compiling solely chiller data, solely chiller cluster data, or a combination of the two. Further, the preparation of the aforementioned chiller data and/or chiller cluster data for validation can be done in various ways. For example, in some embodiments preparation for validation may include chronologically organizing data, while some embodiments may include organizing the data according to source, while some embodiments may include alternative data preparation.

In step 746, process 740 trains and validates generated models. In some embodiments, models can be trained and validated based on chiller data and chiller cluster data and can also incorporate historical operational data 722. The training and validation of the models can be the same or different based on the incorporation of chiller data and/or cluster data. For example, step 746 may include training and validating single chiller models using data that has been collected from single chillers rather than chiller clusters, with the same being true for and historical operational data 722 that may be implemented. Similarly, step 746 may include training and validating chiller cluster models using data that has been collected from chiller clusters rather than single chillers, with the same being true for any historical operational data 722 that may be incorporated in the training and validating processes. Training processes can be different for single chiller models and chiller cluster models in some embodiments. For example, machine learning, deep learning, and transfer learning techniques implemented in the training of single chiller models may be the same as, similar to, or different from the machine learning, deep learning, and transfer learning techniques used in training chiller cluster models. Further, various validation methods can be used for both validating single chiller models and chiller cluster models.

In step 748, process 740 assesses performance of models and categorizing chillers and chiller clusters and making cluster, according to some embodiments. Step 748 can include prediction performance assessor 724, as well as cluster assigner 726 of FIG. 7A, according to some embodiments. Performance of models in step 742 can be analyzed using various means, methods and techniques, which may vary in some embodiments. For example, models associated with chiller training data can be analyzed differently than models associated with chiller cluster training data, according to some embodiments. Further, assignment of chillers to clusters can vary depending on various factors including user and/or operator preferences. In some embodiments, performance assessment techniques may be variable, and as such so too may list of bad chillers 728, list of good chillers 730, and list of good clusters 732 of FIG. 7A.

In step 750, process 740 is shown to include sending training data and corresponding models for good chillers and good clusters to connected chiller service. As mentioned with step 748 above, chillers and chiller clusters designated as good chillers and good chiller clusters can vary. Similarly, the models thereof included in step 750 can also vary according to some embodiments in terms of which chillers and/or chiller clusters can have corresponding training data and models sent to a component the same or similar to connected chiller service 734 of FIG. 7A, according to some embodiments. As such, connected chiller service of step 750 can vary, for example including solely chiller training data and models in some embodiments, including solely chiller cluster training data and models in some embodiments, and including both chiller and chiller cluster training data and models in some embodiments.

In step 752, process 740 is shown to include periodically evaluating all bad chillers, good chillers, and good chiller clusters according to some embodiments. Chillers and chiller clusters that can be designated as good or bad can vary. Additionally, all bad chillers, good chillers, and good chiller clusters can be periodically evaluated and/or re-evaluated using steps similar to those of process for chiller evaluation 740. Further, the methods and/or techniques that can be used for periodic evaluation and re-evaluation of bad chillers, good chillers, and good chiller clusters, as wells as their associated training data and models, can vary according to some embodiments and can also vary according to user and/or operator preference. Also, step 752 of process 740 can be the final step of process for chiller evolution 740, according to some embodiments. In some embodiments, process 740 may be cyclical, which is to say that some or all of the steps seen in FIG. 7B may be repeated multiple times.

Figure 7C:
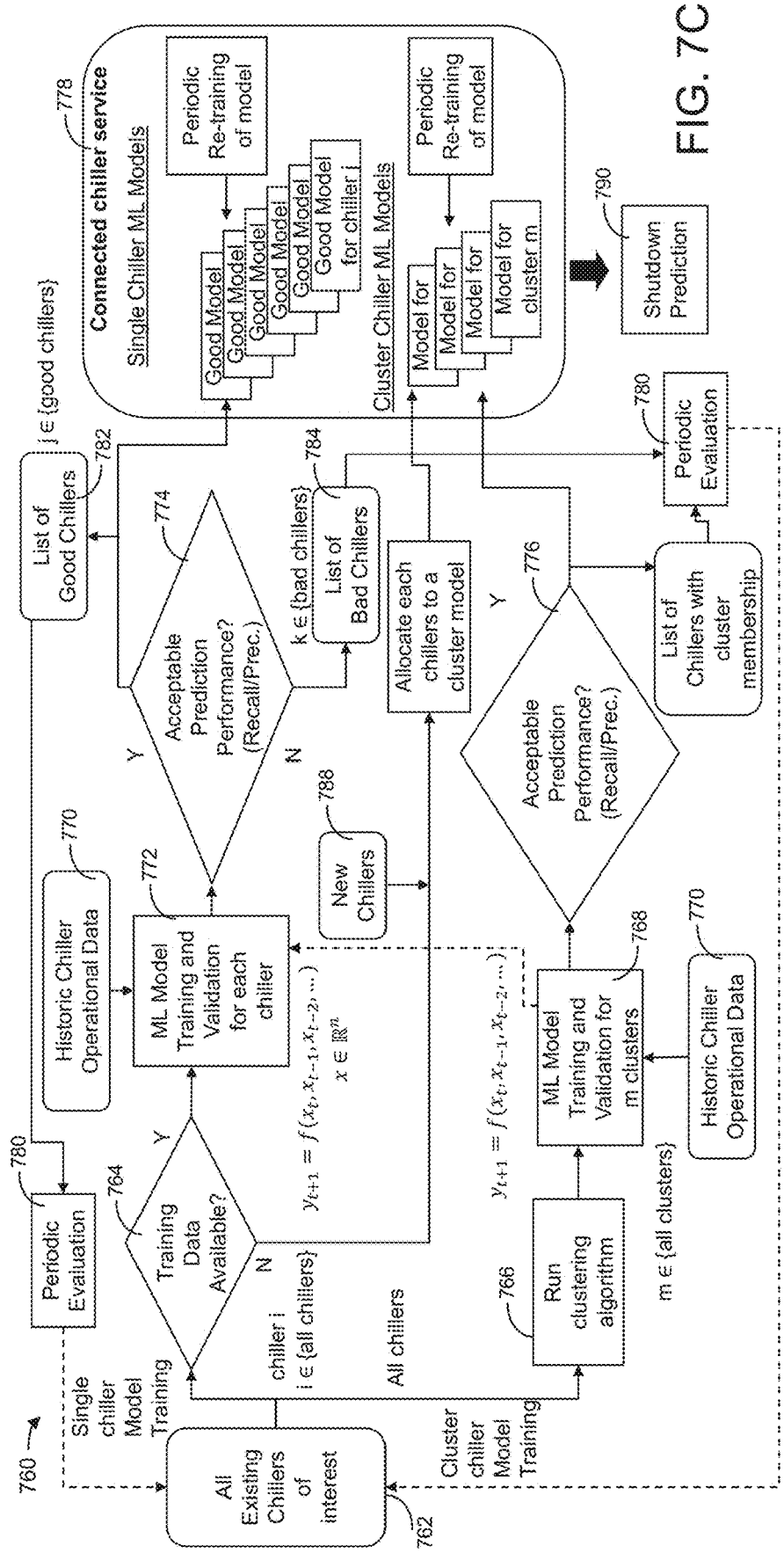
FIG. 7C is another flow diagram of the process of FIG. 7B, according to an exemplary embodiment.

Referring now to FIG. 7C, a flow diagram of a process 760 for model training and evaluation is shown. It should be noted that the flow diagram seen in FIG. 7C can include one or more steps and/or processes that may be similar to and/or performed by the components of FIGS. 7A-B, according to some embodiments. FIG. 7C is shown to include both single chillers and cluster chillers, as well as an initial evaluation to determine, identify, and/or sort single chillers from cluster chillers, according to some embodiments. In some embodiments, all existing chillers of interest are known, with said chillers then identified as being either single chillers or part of a chiller cluster. Depending on whether chillers are identified as single chillers or cluster chillers, model training and evaluation can occur differently.

Process 760 is shown to include all existing chillers of interest 762, for which process for model training and evaluation 760 also includes single chiller training and model evaluation, similar to steps 742 and 744 of FIG. 7B, according to some embodiments. In the instance that single chillers are identified in the initial step of model evaluation, a determination can then be made as to whether training data is available by a data identification 764, which is similar to step 746 of FIG. 7B, according to some embodiments. If a determination can be made that training data is not available, a single chiller may be allocated to a cluster for which one or more models are available, similar to step 748 of FIG. 7B, according to some embodiments. Should training data be available, machine learning, deep learning and/or transfer learning may be applied by a chiller model training 772 in order to generate and or train one or more models for a single chiller, with historic chiller operational data 770 being incorporated as well according to some embodiments. Once one or more models for a single chiller have been generated, model performance may then be evaluated by a chiller performance evaluation 774. In the instance that the performance and prediction capabilities of the one or more models is deemed to be acceptable, and similar to step 750 of FIG. 7B, the one or more models can then undergo a good chiller identification 782 and can be stored with other identified good models as part of a connected chiller service 778, which can be similar to connected chiller service 734 of FIG. 7A. Other chillers may undergo a bad chiller identification 784. In some embodiments, good models for single chillers can be stored in connected chiller service 778 and used to a shutdown prediction 790, according to some embodiments. Alternatively, in the instance that the performance and prediction capabilities of the one or more models is not deemed to be acceptable, the one or more models can then undergo a periodic evaluation 780, similar to step 752 of FIG. 7B, and the corresponding chillers may be allocated to a list of bad chillers. In the instance that the single chiller is deemed to be a bad chiller, it may be subject to periodic evaluation 780 as such.

Process 760 is shown to include cluster chiller training and model evaluation as well as single chiller model training and evaluation. Following the identification of cluster chillers rather than a single chiller, a cluster evaluation 766 can implement a clustering algorithm, similar to steps 744 and 746 of FIG. 7B. A new chiller addition 788 may also be incorporated into a cluster, according to some embodiments. Machine learning, deep learning, and/or transfer learning may then be implemented by a cluster model training 768 in order to train cluster chiller models. Historic chiller operational data 770 may also be incorporated, according to some embodiments. Cluster chiller models may then be evaluated by a cluster performance evaluation 776 for acceptable performance and prediction capabilities, similar to steps 748 and 750 of FIG. 7B, according to some embodiments. In the instance that performance and prediction capabilities are not verified and deemed unacceptable, cluster chillers may be listed for cluster membership, and may then undergo periodic re-evaluation as such, according to some embodiments. In the instance that model performance and prediction capabilities are deemed to be acceptable and are verified, cluster chiller models may be stored in connected chiller service 778 and used to generate a shutdown prediction 790 of for shutdown events, similar to step 750 of FIG. 7B, according to some embodiments. Models deemed to have acceptable performance and prediction capabilities may also be subject to periodic evaluation 780 and re-training as well, similar to step 752 of FIG. 7B.

Figure 8A:
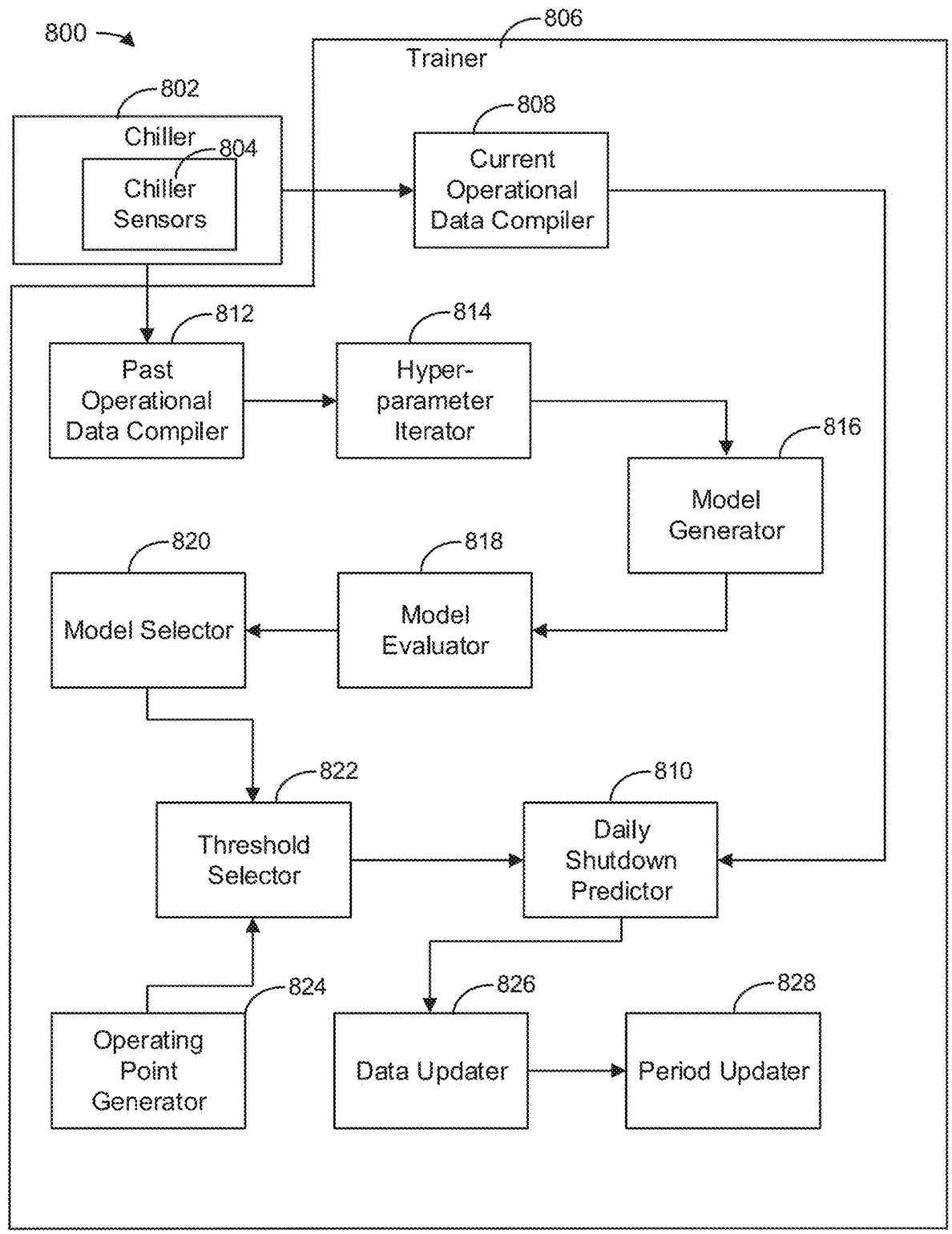
FIG. 8A is a block diagram of the trainer including the threshold selector and the model selector illustrated in FIG. 6 shown in greater detail, according to an exemplary embodiment.

Adaptive Model Selection with Optimal Hyper-Parameters for Anomaly Detection of Connected Chillers Referring now to FIG. 8A, a system for model training and selection 800 is shown. System 800 may be configured to train a plurality of different models for a variety of different equipment, similar to chiller 702 and chiller cluster 706 of FIG. 7A. Additionally, system 800 may also be configured to continuously and/or adaptively train machine learning and deep learning models corresponding to both chiller 702 and chiller cluster 706 of FIG. 7A, which is to say that system 800 may be configured to train single-chiller and multiple-chiller models based on available historic training data. System 800 may also implement hyper-parameter tuning of machine learning and/or deep learning models in order to identify and select well-performing models for deployment for connected chiller services, which may be similar to connected chiller service 734 of FIG. 7A. Also, system 800 may also be configured to continuously and/or adaptively re-evaluate and re-train well-performing models as well as poorly performing models, according to some embodiments. This re-evaluating and re-training may involve the implementation and analysis of cluster models, as well as the use of hyper-parameters for tuning purposes. Recently accumulated historic training data may also be a component of the re-evaluation and re-training process that may be performed by system 800, which may also include updating event detection models. That is to say that as operational data is accumulated, this data may be implemented in re-evaluation and re-training of models in order to improve the prediction of future events of components such as chiller 702 and/or chiller cluster 706 such that shutdowns, faults, and other possible events may be more accurately predicted. Additionally, system for model training and selection may also include transfer learning as one possible means of best training models. For example, system 800 may allow for data and corresponding single-chiller models to be applied to clustered-chiller models, and vice-versa. System 800 may also implement machine learning and/or deep learning practices in conjunction with transfer learning practices, for example applying weights and biases of a deep neural network model.

System 800 may also lead to an increased accuracy of fault prediction models for chiller 702 and chiller cluster 706 of FIG. 7A, which may include connected chillers and/or connected chiller services such as connected chiller service 734 also of FIG. 7A, according to some embodiments. An increase in prediction accuracy for events that may occur for any possible connected chillers and/or other equipment may include many benefits to operators. For example, accurately predicting an event such as a shutdown for a component such as a chiller may allow operators to reduce equipment down time, thus reducing operational costs. Additionally, this may lead to a reduction in possible maintenance costs in the instance that operators may be able to optimize the scheduling of chiller maintenance services. Prediction of equipment events including shutdowns may also allow for reduced repair costs, with appropriately scheduled maintenance possibly reducing the likelihood of emergency maintenance being required. Prediction of possible equipment events may also allow for operators to improve customer service, as well as potentially extend the possible lifespan of equipment. Another possible advantage that may result from the implementation of system 800 is an overall increased revenue for the operator of the equipment, with accurate predictions allowing for ideal operation of subsequent equipment.

System 800 is shown to include a chiller 802, which is in turn shown to include chiller sensors 804. Chiller 802 is also shown to be in communication with a current operational data compiler 808, which is included in a trainer 806, according to some embodiments. Chiller sensors 804 of chiller 802 may be positioned, on, within, or adjacent to chiller 802, and may also be configured to collect a variety of data. For example, chiller sensors 804 may collect data that includes input and output values, duration of operations, efficiency metrics, as well as other possible data pertaining to chiller 802 and/or the operation thereof. Chiller 802 may be a single unit that operates a system, or may be part of a collection of components, possibly a cluster, with chiller 802 possible being the same, similar to, or different than other components of said collection. Chiller 802 may also have specific attributes that vary. For example, chiller location, orientation, size, capacity, age, and other factors may vary and as such, data collected by chiller sensors 804 may also vary depending on both the specific attributes and characteristics of chiller 802. Chiller sensors 804 may collect data, and may also store, sort, and communicate data with other components that may exist within system 800.

System 800 is shown to include trainer 806. Trainer 806 is shown to include several components, according to some embodiments. Trainer 806 can also aid in the implementation of some and/or all of the deep learning and machine learning techniques discussed above that components of system 800 collectively implement. For example, while chiller sensors 804 collect data for chiller 802, the analysis of collected data as well as subsequent re-evaluation and re-training of existing models may be performed at least in part by trainer 806. Trainer 806 may operate iteratively and may also operate on a predetermined and/or variable cycle for occur. Trainer 806 may also include some, all, and/or different components than those seen in FIG. 8A, and such variations in components may depend on variables including specifics of chiller 802, chiller sensors 804, as well as other possible factors.

Trainer 806 can implement different training methods and techniques, which may depend on a variety of factors. For example, training a single chiller model may involve processes that may be the same and/or different than processes used in training a chiller cluster model. Further, training practices and procedures may vary according to the incorporation of chiller data. For example, training a single chiller model may not involve the use of any chiller cluster data, while training a chiller cluster model may require the implementation of single chiller data. In some embodiments, historical operational data 722 or similar may be incorporated into the processes of trainer 806. For example, historical operational data 722 or similar may contain data from a critical event for which a single chiller model and/or chiller cluster models must be trained to predict. Trainer 806 may also implement historical operational data 722 or similar for a variety of different time frames and scenarios. For example, some historical operational data 722 or similar may become obsolete by means of installation of new chillers, new chiller and/or chiller cluster models, as well as other means. Trainer 806, in some embodiments, can determine historical operational data 722 or similar relevant to specific chillers, as well as specific chiller and/or chiller cluster models in order to train models as accurately as possible. Further, the training processes of trainer 806 can include machine learning, deep learning, and transfer learning techniques similar to those used by various models for prediction.

Trainer 806 may also implement hyper-parameters in the training of both single chiller and chiller cluster models. In some embodiments, each model for single chillers and/or chiller clusters has a set of hyper-parameters that can be tuned in order to adjust model accuracy. As such, trainer 806 may train models with multiple sets of hyper-parameters in order to evaluate the predictions of the models with the various different sets of hyper-parameters applied. In some embodiments in which machine learning and/or deep learning and/or transfer learning models may be used in the generation of predictions such as the application of single chiller models and cluster chiller models, hyper-parameter iteration can be critical to the accuracy of model predictions. As such, trainer 806 can be configured to perform iterative hyper-parameter processes in order to maximize the accuracy of the predictions generated by the machine learning, deep learning, and transfer learning models of the single chiller and chiller cluster models, according to some embodiments.

Trainer 806 is shown to include current operational data compiler 808. Current operational data compiler 808 is shown to be in communication with a daily shutdown predictor 810, according to some embodiments. Current operational data compiler 808 may also be in communication with chiller 802 and chiller sensors 804 thereof, which may allow for data collected by chiller sensors 804 relating to chiller 802 to be communicated to current operational data compiler 808. Such data that may be communicated from chiller 802 to current operational data compiler 808 may include usage details, input and output quantities, efficiency metrics, as well as other possible data pertaining to chiller 802 as it operates. That is to say that the data communicated from chiller 802 to current operational data compiler 808 may not impact the immediate re-evaluation and re-training of models that may be performed as a part of trainer 806 and subsequently system for model training 808.

Trainer 806 is shown to include daily shutdown predictor 810. Daily shutdown predictor 810 is shown to be in communication with current operational data compiler 808, as well as a data updater 826 and a period updater 828, according to some embodiments. Daily shutdown predictor 810 can, through communication with current operational data compiler 808, receive current operational data so as to provide a basis for the generation of a daily shutdown prediction, according to some embodiments. For example, daily shutdown predictor 810 may receive current operational data from current operational data compiler 808, which can impact a daily shutdown prediction generated by current operational data compiler 808, according to some embodiments. Daily shutdown predictor 810 can generate various daily shutdown predictions, with said predictions variable based on current operational data received from current operational data compiler 808, as well as the specifics of chiller 802 and the data collected by chiller sensors 804, which may vary according to some embodiments.

Trainer 806 is also shown to include data updater 826. Data updater 826 is also shown to be in communication with daily shutdown predictor 810, according to some embodiments. As such, data updater 826 can receive daily shutdown predictions that have been generated by daily shutdown predictor 810, and may update data accordingly, according to some embodiments. Data updater 826 can update a variety of data upon the receipt of daily shutdown predictions from daily shutdown predictor 810, with the data that may be updated to include data and corresponding models that may be analyzed and implemented in the re-evaluation and re-training of chillers such as chiller 802, for example. Data updater 826 can also update general data with daily shutdown predictions, which may subsequently allow for analysis of daily shutdown predictions in relation to data collected by chiller sensors 804. That is to say that data updater 826 may update a variety of data, which may allow for the comparison and accuracy evaluation of daily shutdown predictions generated by daily shutdown predictor 810 in relation to data collected by chiller sensors 804. Data updater 826 may also update other stored data to include the most recently collected data that may enable further analysis of models in use for the training, possibly through transfer learning, machine learning, and/or deep learning, of chillers such as chiller 802, for example.

Trainer 806 is shown to include period updater 828. Period updater 828 is shown to be in communication with data updater 826, according to some embodiments. Period updater 828 may update a variety of components of trainer 806 relative to new data that has been collected and subsequently updated by data updater 826, according to some embodiments. For example, after current operational data compiler 808 has collected data from chiller sensors 804, with the data having then been processed by daily shutdown predictor 810 and updated by data updater 826, period updater 828 may update data used in the generation, training, and evaluation of new models as well as the re-evaluation and re-training of existing models. Further, period updater 828 may also provide an indication to components of trainer 806 that recently collected data relates to a specified, period. For example, if a shutdown event were to occur in chiller 802, period updater 828 may indicate that data collected during the shutdown event of chiller 802 pertains to a specific period and may also indicate specific start and end points to such a period. It should also be noted that the components updated by period updater 828 may include components of trainer 806 seen in some embodiments.

Trainer 806 is shown to include a past operational data compiler 812. Past operational data compiler 812 is shown to be in communication with a model generator 814, according to some embodiments. Past operational data compiler 812 may compile operations data that spans a set time period, with said time period depending on other attributes of trainer 806, as well as system 800. For example, in the instance of a relatively recently installed chiller such as chiller 802, chiller sensors 804 may not have collected sufficient data to be compiled by past operational data compiler 812, in which case past operational data compiler 812 may include data collected from other chillers the same as and/or similar to chiller 802. Past operational data compiler 812 may also prepare compiled data for analysis and application by model generator 814, such as creating data sets that may be for specific time periods, or sorting data based on possible chiller events that may have occurred during the time period for which the data was collected, according to some embodiments. In some instances, a customer and/or operator of system 800 may select specific occurrences which may be found in past operational data that may be identified by past Trainer 806 is shown to include a hyper-parameter iterator 814. Hyper-parameter iterator 814 is shown to be in communication with past operational data compiler 812, according to some embodiments. As such, hyper-parameter iterator 814 can be configured to receive an input from past operational data compiler 812. In some embodiments, chiller shutdown prediction models can be generated, tuned, and/or trained based on a choice of hyper-parameter. Hyper-parameter iterator 814 can be configured to select, determine and/or identify a hyper-parameter from a set of multiple hyper-parameters through which hyper-parameter iterator 814 may iterate. According to the selection of hyper-parameter by hyper-parameter iterator 814, appropriate corresponding models may be generated by model generator 816, according to some embodiments. Generated models may each have a set of hyper-parameters that require tuning in order for the model to operate optimally. As such, developing machine learning, deep learning, and transfer learning models useful in prediction can be dependent on the corresponding sets of hyper-parameters for the models. In some embodiments, hyper-parameter iterator 814 can train multiple models with different sets of hyper-parameters in order to determine which set of hyper-parameters produces the most accurate predictions for each model. Further, in some embodiments this may be an iterative process. Determination of hyper-parameters may be involve analyzed function of equipment such as chiller 802 and may also include user and/or operator preferences. Hyper-parameters implemented by hyper-parameter iterator 814 may vary in some embodiments. In some embodiments hyper-parameters may incorporate data collected from chiller sensors 804 of chiller 802, or another similarly configured chiller with sensing equipment. For example, if W indicates a hyper-parameter, then W can take values such as W=30 days, W=365 days, and/or W='All Data'. It should be also noted that multiple hyper-parameters and models can exist for a single chiller such as chiller 802, according to some embodiments.

Trainer 806 is shown to include model generator 816. In some embodiments, model generator 816 may be configured to receive one or more hyper-parameters from hyper-parameter iterator 814, which can be in communication with model generator 816. Model generator 816 can be dependent on a number of factors, including chiller data and hyper-parameters, that impact the generation of models that may apply machine learning and deep learning concepts, according to some embodiments. In some embodiments, for example, model generator 816 may generate multiple models for each set time period for which data is available. These models generated may be done so based on one or more hyper-parameters which may be made available to model generator 816, which may be a component of and made available to trainer 806, according to some embodiments. Models generated by model generator 816 may be based on training data, with the data possibly having been collected by chiller sensors 804 of chiller 802, or a similar structure. Model generator 816 may generate models just relevant to chiller 802 in some embodiments or may generate a model or models applicable to a plurality of chillers the same as and/or similar to chiller 802. Some models generated by model generator 816 can include machine learning models, which more specifically can include Multivariate Gaussian Modeling (MVG) and Graphical Gaussian Modeling (GGM). Similarly, some models generated by model generator 814 can include deep learning models, which more specifically can include Long Short Term Memory (LSTM) with Autoencoder and Variational Autoencoder (VAE) configurations. Additionally, model generator 816 may also construct different models for different scenarios, with possible preferences and specifications for desired models to be indicated by an operator with model generator 816 thus accounting for preferred variables and other potential factors.

Trainer 806 is shown to include model evaluator 818. Model evaluator 818 is shown to be in communication with model generator 816, according to some embodiments. Model evaluator 818, through communication with model generator 816, may receive one or more models that have been trained using one or more hyper-parameters, according to some embodiments. Model evaluator 818 may receive multiple models from model generator 816 that have been trained for a given time period. Also, model evaluator 818 may employ one or more algorithms to evaluate models, according to some embodiments. Algorithms implemented by model evaluator 818 on models received from model generator 816 may be configured to evaluate said models without using any test data. In some instances, the use of test data (artificially generated data that has not been collected from real equipment) may impair the training and eventual operation of models. Model evaluator 818 may ultimately evaluate a plurality of models using a variety of techniques and may also use said techniques and other algorithms to ultimately select one or more models from the set of received models based on evaluation results.

Trainer 806 is shown to include a model selector 820. Model selector 820 is shown to be in communication with model evaluator 818, according to some embodiments. Model selector 820 may select models based on varying statistics calculated depending on the nature of the data received from model evaluator 818, according to some embodiments. For example, if training data includes a fault such as a shutdown, model selector 820 may select based on a measure of area under the curve (AUC) calculated under receiver operating characteristics (ROC) for the given model. In some instances, a larger area under the curve may correspond to better model performance than a lesser area under the curve. Further, in the instance that faults such as shutdowns were not present in training data, model selector 820 can use a measure of a probability density function (PDF). The measure of the probability density function can indicate how well a model has learned normal behavior and can be calculated in multiple ways. Some calculation methods can include assigning equal weight to all points of a given training period for which a model is trained, while other calculation methods can assign weights to different points within the time period of the training data so as to prioritize a specific time. The measure of the probability density function may then have a standard deviation for which an inverse thereof can be calculated, with the standard deviation normalized by mean. The calculated values for both the area under the curve of the receiver operating characteristics and the inverse of the standard deviation normalized by mean of the measure of the probability density function can be indicative of how well a model has learned normal behavior. Also, it should be noted that for models trained with data deficient of a shutdown, ROC may not be able to be calculated, thus necessitating the determination of the measure of the probability density function. Additionally, in the selection of models performed by model selector 820, probability measures may be analyzed regardless of the presence or lack thereof of a shutdown in training data.

Model selector 820 can be configured to analyze the calculations performed by model evaluator 818 in order to determine and select the best model. In some embodiments, the calculated value of the area under the curve of the receiver operator characteristic which can be calculated for data including shutdowns can be compared to the calculated value of the inverse of the standard deviation normalized by mean for the measure of the probability density function which can be calculated for data that does not include shutdowns. Model selector 820 can then compare the calculated values of the area under the curve of the receiver operating characteristics and the inverse of the standard deviation normalized by mean of the measure of the probability density function. In some embodiments, model selector 820 can be configured to select the model with the greatest value when the calculated values of the area under the curve of the receiver operating characteristics and the inverse of the standard deviation normalized by mean of the measure of the probability density function are compared. That is to say that, according to some embodiments, model selector 820 is configured to select the greatest calculated value of either the area under the curve of the receiver operating characteristics or the inverse of the standard deviation normalized by mean of the measure of the probability density function, with the selection of the greatest value corresponding to the selection of a best performing model.

Trainer 806 is shown to include a threshold selector 822. Threshold selector 822 is shown to be in communication with daily shutdown predictor 810, according to some embodiments. Threshold selector 822 is also shown to receive one or more selected models from model selector 820, according to some embodiments. The threshold selection of threshold selector 822 may be performed on one or more models to have been determined to have the best hyper-parameter set. Additionally, the selected threshold of the aforementioned selection process of threshold selector 822 may involve a p-measure needed to achieve a desired operating point. In some embodiments, the p-measure for any point in a training period can be a function of the probability of that point being anomalous (non-normal), as calculated by a chosen model. The operating point to be selected may vary according to user and/or operator preference, among other variable factors. The selection of a threshold by threshold selector 822 may be expressed in terms of a false positive, i.e. false positive should be below 2/365. It should also be noted that in the event that calculation of the ROC is possible, a threshold may be able to be selected by threshold selector 822 directly on the ROC to achieve a given operating point. Conversely, in the event that ROC may not be available, estimation may be performed by threshold selector 822 in terms of probability distribution of the p-measure with the threshold possibly being expressed as a percentile point on the distribution, i.e. the 95th percentile of the p-measure evaluated. Further, time-series modeling can also be performed on the p-measure in order to forecast p-measures for all time points within a given test window, and a threshold can be determined based on a predictive series. It should also be noted that threshold selector 822 may employ a variety of means, including those details above as well as other possible means and methods in order to determine and possibly set a desired threshold which may be determined by a number of inputs and/or factors.

Trainer 806 is shown to include an operating point generator 824. Operating point generator 824 is shown to be in communication with threshold selector 822, according to some embodiments. Operating point generator 824 may be subject to user and/or operator preference. For example, a user and/or operator may have specific preferences in terms of the operation of chiller 802, for example. As such, models generated, trained, and selected by components of trainer 806 may have constraints and/or operating points tied to the models implemented in the form of thresholds, such as thresholds determined by threshold selector 822. That is to say that, in the process of threshold selector 822 determining, selecting, and implementing a threshold, operating point generator 824 may influence the aforementioned process of threshold selector 822, according to some embodiments. Operating point generator 824 may also vary, for example the preferences of one user and/or operator may differ greatly from another, in which case some embodiments may carry substantially different activity of operating point generator 824 and subsequently different activity and results of threshold selector 822. It should also be noted that both operating point generator 824 and threshold selector 822 may operate simultaneously and may also operate so as to determine multiple operating points and thresholds simultaneously, depending on circumstances.

Figure 8B:
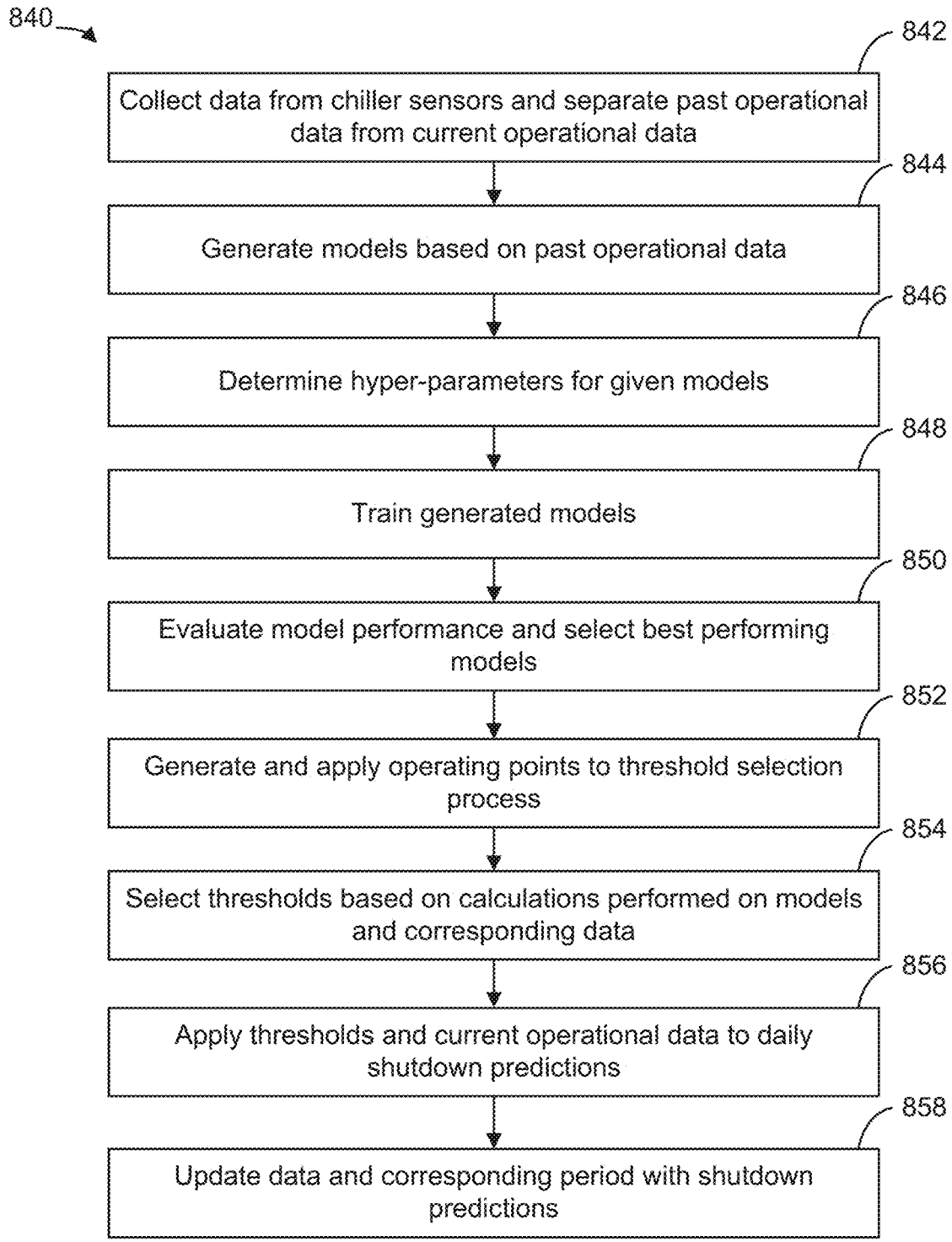
FIG. 8B is a flow diagram of a process of training models, selecting models, and determining thresholds for the selected models that can be performed by the trainer illustrated in FIG. 8A, according to an exemplary embodiment.

Referring now to FIG. 8B, a process for model training 840 is shown. It should be noted that process 840 and its component steps maybe performed by and/or related to components of FIG. 8A, according to some embodiments. Further, process 840 may be performed for one or more chillers. Additionally, process 840 may be performed iteratively and/or cyclically, which is to say that one or more chillers and their associated training data and corresponding models me experience parts of or process 840 in its entirety multiple times. Process 840 may also be performed with additional steps or with slight modifications according to some embodiments.

In step 842, process 840 is shown to include collecting data from chiller sensors and separating past operational data from current operational. Both current operation data and past operational data of step 842 may have been collected by chiller sensors 804 of chiller 802. Further, both past operational data and current operational data may include various data such as input and output quantities, efficiency metrics, usage values, among other data and as such may be organized, sorted, and or separated in various ways. Additionally, past operational data and current operational data may be compiled and or otherwise acted upon by past operational data complier 812 and/or current operational data compiler 808 or similar, both of FIG. 8A, according to some embodiments.

In step 844, process 840 is shown to include generating models based on past operational data. Step 844 of process 840 can be performed by model generator 814 of FIG. 8A or another similar component, according to some embodiments. Further, step 844 may be performed differently depending on various factors. For example, past operational data for which a model is to be generated may contain data for different time periods (i.e. epochs), according to some embodiments. As such, models may be generated using different methods and or techniques based on the time period for which the data was generated, among other variables such as contents of past operational data. Additionally, step 844 can also include generating models that implement various methods and techniques in predicting future events, with those methods and techniques including machine learning, deep learning, and transfer learning.

In step 846, process 840 is shown to include determining hyper-parameters for given models. Step 846 may vary according to user and/or operator preferences that may be incorporated into the determination of hyper-parameters. For example, in the instance that efficiency may by a primary concern for a user and/or operator, such concerns may correspond to a range for which hyper-parameters may exist, according to some embodiments. Further, determination of hyper-parameters may be performed by a component the same as or similar to hyper-parameter iterator 814 of FIG. 8A, according to some embodiments. In some embodiments, generated models may have one or more sets of hyper-parameters that can be tuned in order to optimize accuracy of the models. In some embodiments, applying hyper-parameters correctly to machine learning and/or deep learning and/or transfer learning models can be a critical component of model performance. As such, step 846 may be performed iteratively, with different sets of hyper-parameters used to train multiple models in order to ultimately select hyper-parameters for each model that produce the most accurate predictions.

In step 848, process 840 is shown to include training generated models. Training generated models as seen in step 848 may include components the same as or similar to hyper-parameter iterator 814 and model generator 816 of FIG. 8A. Additionally, training of generated models may vary according to some embodiments. For example, given that past operational data on which models are based may vary, so too may techniques for model generation. In the instance that past operational data includes several large data sets and subsequently corresponds to several large models, the models may be trained using a different method or technique than for past operational data that includes shorter data sets, according to some embodiments. Further, generated models may be trained differently in some embodiments according to preferences of users and/or operators. That is to say that, in some embodiments, models may be trained according to user and/or operator preferences. For example, if a user and/or operator expressed a desire to optimize specific parameters for a system such as efficiency or output, models training of step 848 may be trained accordingly.

In step 850, process 840 is shown to include evaluating model performance and selecting best performing models. Step 850 may, in some embodiments, include components the same as or similar to model evaluator 818 and model selector 824 of FIG. 8A. Further, step 850 may vary in both the evaluation process as well as the selection process for generated and trained models. For example, in some instances models may have been generated using past operational data that included shutdown events, which may call for a specific evaluation method that may not be applicable to or effective for models generated using past operational data deficient of shutdowns. Step 850 may also vary according to embodiment in terms of model selection. In some embodiments, models may be evaluated mathematically. Further, models may be evaluated according to the process described for model evaluator 818 in which calculations are performed in order to evaluate models with the specific calculations dependent on the corresponding training data for a model. In some embodiments, a model with one or more shutdowns present in a training period can have a corresponding area under the curve found for generated receiver operating characteristics. Models that do not contain shutdowns in training data may be evaluated by calculating an inverse standard deviation normalized by mean for a measure of a probability density function, according to some embodiments. In some embodiments, the calculated area under the curve of the receiver operating characteristics and the standard deviation normalized by mean for the measure of the probability density function may be compared, with the greatest value indicating the best performing model. In some embodiments in which a user and/or operator has preferences for model performance, such preferences can be incorporated into the model selection process in various ways.

In step 852, process 840 is shown to include generating and applying operating points to the selecting models. Step 852 can include operating point generator 824 of FIG. 8A or similar, according to some embodiments. Step 852 may also vary according to various factors, among them application of user and/or operator preferences. For example, a user and/or operator may have defined performance expectations for chillers, in which case step 852 and the generation of operating points may be impacted by and also incorporate such preferences. Additionally, generation of operating points may depend on past operational data used in generating models, specific chillers that may be impacted, as well as other variables.

In step 854, process 840 is shown to include selecting thresholds based on calculations performed on models and corresponding data. Step 854 can include threshold selector 822 of FIG. 8A or similar, according to some embodiments. Step 854 may also vary in terms of the methods and/or techniques implemented in selection of thresholds. For example, some models may have been generated using past operational data that included shutdowns, for which evaluation of projected model performance must be conducted differently than for models that may have been generated using past operational data that did not include shutdowns, according to some embodiments. Further, models for different chiller types may differ in configuration and may thus require different thresholds and thus different calculations of their associated models. Step 854, as with other previous steps, may also incorporate user and/or operator preferences into the selection of thresholds.

In step 856, process 840 is shown to include applying thresholds and current operational data to daily shutdown predictions. Step 856 can include daily shutdown predictor 810 of the FIG. 8A or another similar component, according to some embodiments. Additionally, daily shutdown predictions can incorporate current operational data as well as past operational data. For example, both past operational data and current operational data may have been collected from chiller sensors 804 of chiller 802 in FIG. 8A, or another similar component. Further, past operational data may be from various previous time periods, while current operational data may serve as an indication of more recent activity of chiller 802 or similar, according to some embodiments. Additionally, daily shutdown predictor may be configured to account for factors not included in past operational data, current operational data, or input from threshold selections. Such factors may include geographic location, planned activity for chiller 802 or similar, as well as other possible user and/or operator preferences that may further influence a possible shutdown.

In step 858, process 840 is shown to include updating data and corresponding period with shutdown predictions. Step 858 can include daily shutdown predictor 810, as well as data updater 826 and period updater 828 or other similar components, according to some embodiments. Step 858 may also vary according to terms of the updating of data and period. For example, time periods for data collection and corresponding model generation may vary according to variables such as specifics of chiller 802 of FIG. 8A or similar, as well as other possible user and/or operator preferences. Additionally, data updating may vary according to factors such as technical capabilities of equipment involved including memory and hard drive or cloud storage, for example, among other factors. Updating of shutdown predictions may also vary by embodiment for reasons the same as or similar to those above that may possible impact period updating and data updating, as well as other possible reasons such as network configuration, among other possible concerns. It should also be noted that, as the final step in process 840, step 858 may not necessarily serve as a definitive end to such a process. In some embodiments, process 840 may be cyclical, iterative, or otherwise repeat some steps or all steps of process 840.

Figure 8C:
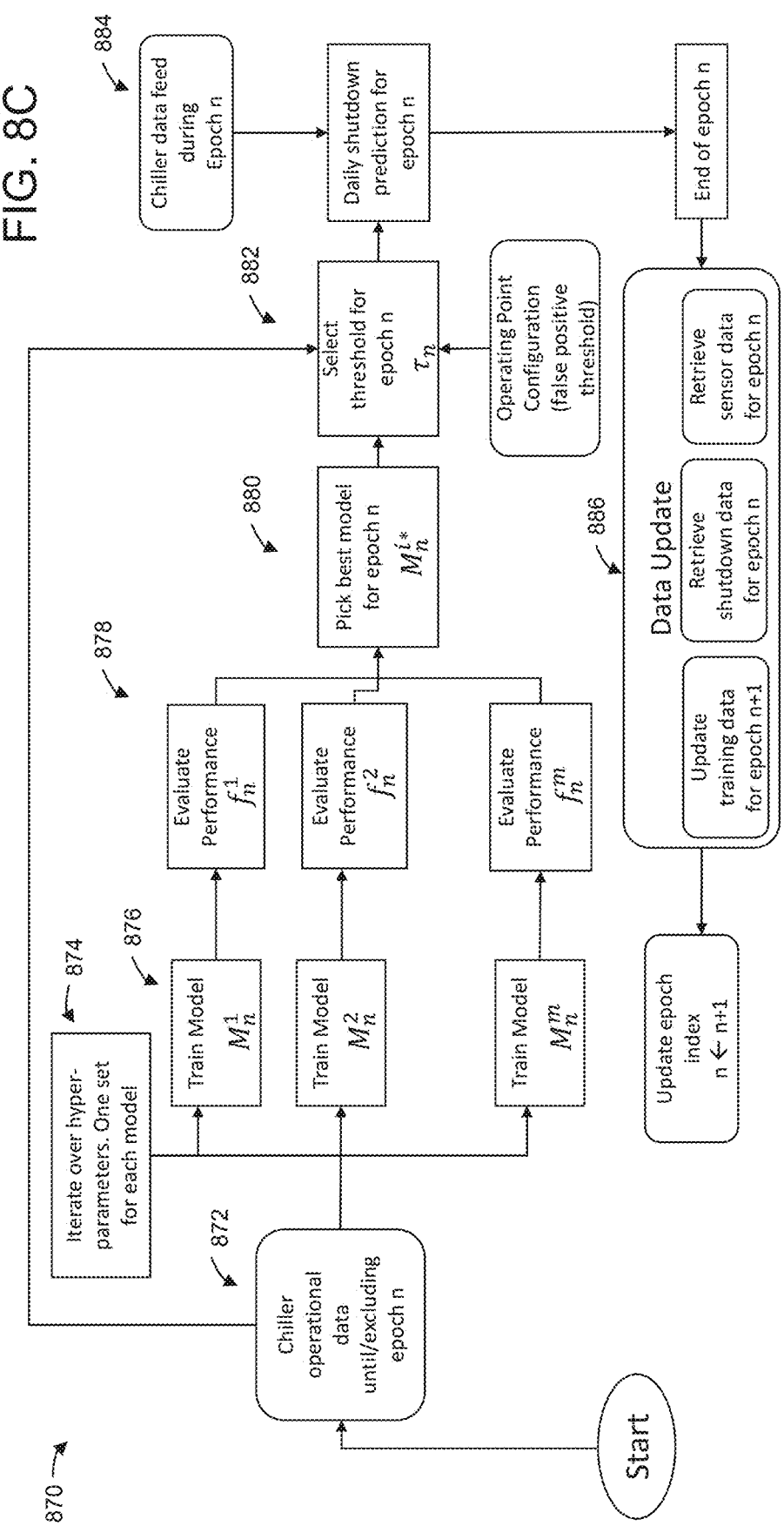
FIG. 8C is another flow diagram of the process illustrated in FIG. 8B, according to an exemplary embodiment.

Referring now to FIG. 8C, a flow diagram of a process for model training and evaluation 870 is shown. Process 870 can be similar to process 840, according to some embodiments. The flow diagram of FIG. 8C and process 870 therein may pertain to systems the same as and/or similar to those for which process 840 may apply. It should also be noted that, according to some embodiments, process 870 may be applied to systems such as that of FIG. 8A in conjunction with process 840.

Process 870 is shown to include a receiving chiller operational data 872. According to some embodiments, receiving chiller operational data 872 may be done for varying time periods (i.e. epochs), and also may contain a variety of different data. Receiving chiller operational data 872 may include collecting data from chiller 802 and chiller sensors 804 of FIG. 8A, according to some embodiments. Receiving chiller operational data 872 may also be the same as or similar to that of steps 842 and 844 of FIG. 8B, according to some embodiments. Receiving chiller operational data 872 may then include sending data for a hyper-parameter iteration 874, which may include components similar to hyper-parameter iterator 814 of FIG. 8A and also similar to step 846 of process 840, according to some embodiments. Further, process 870 is shown to include a model training 876 and a model evaluation 878. Model training 876 and model evaluation 878 may receive include an input of data from receiving chiller operational data 872 and may also operate similar to model evaluator 818 of FIG. 8A. Additionally, model training 876 and model evaluation 878 may correspond to steps 848 and 850 of process 840, according to some embodiments.

Process 870 is shown to include a model selection 880. Model selection 880 may be similar to model selector 820 of FIG. 8A, according to some embodiments, and may also relate to step 850 of process 840 of FIG. 8B. Process 870 is also shown to include a threshold selection 882, according to some embodiments. Threshold selection 882 may include components similar to threshold selector 822 and operating point generator 824 of FIG. 8A. Further, threshold selection 882 may be similar to step 854 of process 840 of FIG. 8B, according to some embodiments. Process 870 is also shown to include a shutdown prediction 884. In some embodiments, shutdown prediction 884 may relate to daily shutdown predictor 810 of FIG. 8A. Additionally, shutdown prediction 884 may also relate to step 856 of process 840 as seen in FIG. 8B. Process 870 is also shown to include a data update 886. Data update 886 can relate to data updater 826 as well as period updater 828 of FIG. 8A and may also correspond to step 858 of process 840 of FIG. 8B, according to some embodiments. Data update 886 can serve as the final step in process for model training an evaluation in some embodiments. However, process 870 may by dynamic and may also operate cyclically with some blocks and other components thereof involved in process 870 multiple times.

Automatic Model Threshold Selection for Anomaly Detection of Connected Chillers

Figure 9A:
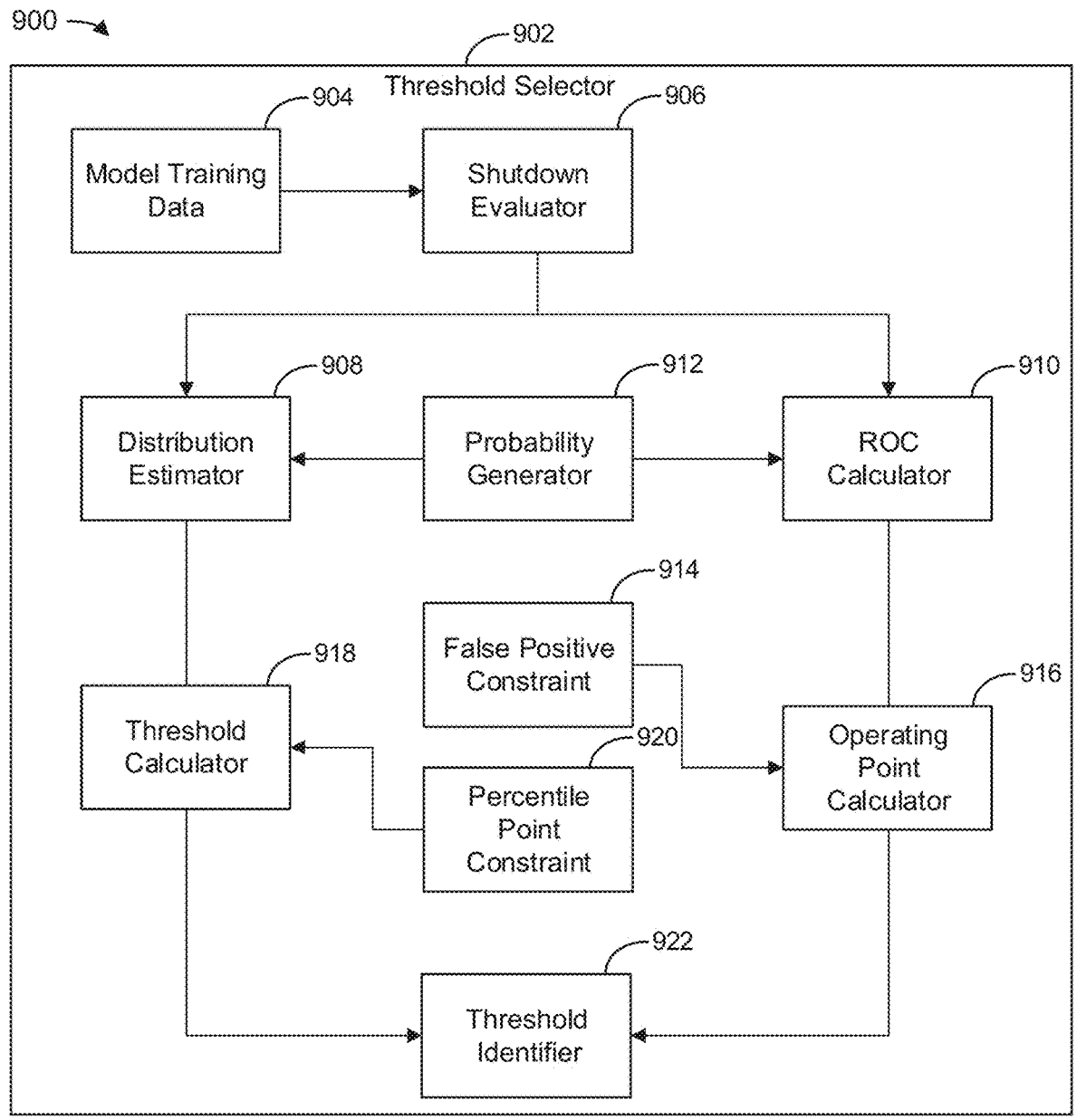
FIG. 9A is a block diagram of a threshold system that may be used in conjunction with one or more chillers, according to an exemplary embodiment.

Referring now to FIG. 9A, a threshold system 900 is shown. System 900 may include a number of other components, such as those seen in FIG. 9A, although components of system 900 may vary according to some embodiments. System 900 can also operate in series, in parallel, and/or in conjunction with the components of system 700 of FIG. 7A, as well as system 800 of FIG. 8A, according to some embodiments. It should also be noted that system 900 may operate in conjunction with a variety of different equipment including but not limited to chiller 702 and chiller cluster 706 of FIG. 7A, as well as chiller 802 of FIG. 8A. In some embodiments, system 900 may also operate in conjunction with other equipment other than the aforementioned components of previous figures.

System 900 is shown to include a threshold selector 902. Threshold selector 902 may include some or all of the components seen in FIG. 9A but may also be deficient of some components seen in FIG. 9A or may also include additional components not seen in FIG. 9A, according to some embodiments. Threshold selector 902 may also perform similarly to threshold selector 822 of FIG. 8A. Additionally, threshold selector 902 may also work in conjunction with machine learning, deep learning, and/or transfer learning techniques, such as those involved in systems of FIG. 7A and FIG. 8A, as well as models and other products generated through the implementation of such techniques. Generally, threshold selector may be configured to aid in the generation of a selection of one or more thresholds to be applied to one or more models that may be implemented in order to govern behavior of equipment that may include chillers, such as chiller 802 of FIG. 8A.

Threshold selector 902 can employ multiple methods and techniques in order to select a threshold for one or more models. In some embodiments, threshold selector 902 may evaluate training data for models for which a threshold is to be selected. For example, if training data for a given model includes a shutdown, threshold selector 902 can perform certain calculations in order to determine a threshold. Further, if training data for a model does not include a shutdown, threshold 902 can perform different calculations in order to determine a threshold. Threshold selector 902 can implement the calculation of receiver operating characteristics for models with training data that included a shutdown, according to some embodiments. Further, an operating point can be obtained on the receiver operating characteristics by threshold selector 902, with the operating point allowing for the identification of a corresponding threshold. Additionally, probability measures can also be incorporated in the calculation of the receiver operating characteristics, and the operating points on the receiver operating characteristics can serve as false positive constraints. In some embodiments, threshold selector 902 can be configured to estimate a probability distribution. Further, threshold selector 902 can then obtain an operating point and corresponding threshold as a percentile point of the probability distribution. In some embodiments, threshold selector 902 can then implement the selected threshold from either calculation method that accounted for the presence of a shutdown event in the training data for a model or a lack thereof.

Thresholds selected by threshold selector 902 can act as a reference point in order for anomalous data to be identified, according to some embodiments. For example, if a model (machine learning, deep learning, transfer learning, etc.) is operating with a threshold selected by threshold selector 902, then said threshold can act to define data analyzed by the model as non-anomalous (normal) or anomalous. Further, if activity occurs that is analyzed by the model and shows data exceeding the threshold selected by threshold selector 902, then that data can be identified as anomalous. In some embodiments, the identification of anomalous data can lead to a prediction of a future fault, such as a shutdown.

Threshold selector 902 is shown to include shutdown evaluator 906. Shutdown evaluator 906 is shown to be in communication with model training data 904, according to some embodiments. Model training data 904 can be the same as or similar to data collected from chiller 702, chiller cluster 706, and/or other similar components. Further, model training data may correspond to a variety of different epochs, according to some embodiments. Shutdown evaluator 906 can be configured to receive an input of data from model training data 904 and may also be configured to process and/or evaluate said data. Shutdown evaluator 906 may also be configured to receive a variety of data, which is to say that any input to shutdown evaluator 906 from model training data 904 may include data of varying size, type, content, and relevant equipment, among other factors, according to some embodiments. Shutdown evaluator 906 may also be configured to analyze data that may be received as an input from model training data 904 for specific content and/or events, such as shutdown events, for example. Further, in the instance that shutdown evaluator 906 may receive an input of data from model training data 904, shutdown evaluator 906 may use one or more of a variety of techniques to process said inputted data in order to identify and shutdown events. If shutdown evaluator 906 may identify one or more shutdown events in data that may have been received from model training data 904, shutdown evaluator 906 may sort and/or otherwise categorize data according to the presence of a shutdown event of a lack thereof. Additionally, in the event that shutdown evaluator 906 identifies a shutdown in any inputted data, shutdown evaluator 906 may output said data including the shutdown event differently than data for which no shutdown events were identified by shutdown evaluator 906. For example, in the event that shutdown evaluator 906 may receive an input of data that is determined to contain a shutdown event, shutdown evaluator 906 may output that data to an ROC calculator 910. Conversely, in the event that shutdown evaluator 906 may receive an input of data that is determined to be deficient of any shutdown events, shutdown evaluator 906 may output that data to a distribution estimator 908, according to some embodiments.

Threshold selector 902 is shown to include distribution estimator 908. Distribution estimator 908 is shown to be in communication with shutdown evaluator 906, according to some embodiments. Distribution estimator 908 can be configured to estimate a probability distribution of a p-measure and/or a threshold based on a percentile point of a distribution. Additionally, distribution estimator 908 may also be configured to estimate a threshold based on a percentile point which may be evaluated under a selected model, according to some embodiments. For example, a specific model which may have been created by and/or implement in operation the practices of machine learning, deep learning, and/or transfer learning may have a distribution calculated by distribution estimator 908 based on a percentile point of the distribution, i.e. the 95th percentile of p-measure evaluated under a selected model. In some instances, for data received by distribution estimator 908 that is determined to contain a shutdown event, other threshold determination methods may not yield threshold values of those determined using a method including distribution estimator 908. It should also be noted that the method and or methods of distribution estimator 908 may include an input from a probability generator 912, according to some embodiments. Probability generator 912 may be configured to determine relevant probability measures which may vary according to data type, content of data, among other factors, and provide probability data to distribution estimator 908. That is to say that a received input from probability generator 912 may be a component of a method implemented by distribution estimator 908 in order to generate an estimated distribution.

Threshold selector 902 is shown to include a threshold calculator 918. Threshold calculator 918 is shown to be in communication with distribution estimator 918, according to some embodiments. Threshold calculator 918 may also be configured to obtain a threshold in terms of a percentile point configuration, according to some embodiments. Additionally, it should be noted that threshold calculator 918 can be configured to determine one or more thresholds, according to some embodiments. For example, threshold calculator 918 may receive one or more distributions from distribution estimator 908, and in turn may calculate one or more thresholds for each of the one or more models. In some embodiments, threshold calculator 918 is also shown to be in communication with a percentile point constraint 920. According to some embodiments, percentile point constraint may use one or more methods to configure an operating point, which may then be communicated to threshold calculator 918. Percentile point constraint 920 can also be configured, in some embodiments, to define a range for which threshold calculator 918 may calculate a threshold for data.

Threshold selector 902 is shown to include ROC calculator 910. ROC calculator 910 is shown to be in communication with shutdown evaluator 906, according some embodiments. ROC calculator 910 can be configured to calculate receiver operating characteristics. ROC calculator 910 may also be configured to receive an input from shutdown evaluator 906, according to some embodiments. For example, in the event that shutdown evaluator 906 were to determine that specific data contained a shutdown event, said data may be inputted to ROC calculator 910. Further, ROC calculator 910 can then calculate an ROC for one or more data sets. In some embodiments for which data may be determined to include a shutdown event, ROC calculations such as those that may be performed by ROC calculator 910 may enable the determination of a threshold. If an ROC has been calculated for a data set, a threshold may be able to be determined and/or selected directly on the calculated ROC in order to achieve a given operating point, according to some embodiments. It should also be noted that ROC calculator 910 may be configured to calculate one or more receiver operating characteristics for one or more data sets.

Threshold selector 902 is shown to include an operating point calculator 916. Operating point calculator 916 is shown to be in communication with ROC calculator 910, according to some embodiments. Operating point calculator 916 may be configured to determine and/or identify an operating point based on an input received from ROC calculator 910, according to some embodiments. For example, upon receiving an input that may include receiver operating characteristics from ROC calculator 910, operating point calculator 916 may then determine one or more operating points based on one or more data sets received from ROC calculator 910. Further, operating point calculator 916 may be configured to select a threshold directly on receiver operating characteristics of inputted data, with said threshold corresponding to a desired operating point, according to some embodiments. Additionally, operating point calculator 916 is shown to be in communication with a false positive constraint 914, according to some embodiments. False positive constraint 914 may be configured to input data, for example a false positive constraint, to operating point calculator 916. In some embodiments, a false positive constraint inputted to operating point calculator 916 from false positive constraint 914 may define a range and/or interval for which operating points may be selected on given receiver operating characteristics by operating point calculator 916.

Threshold selector 902 is shown to include a threshold identifier 922. Threshold identifier 922 is shown to be in communication with operating point calculator 916, as well as threshold calculator 918, according to some embodiments. Threshold identifier 922 can be configured to receive one or more inputs from both operating point calculator 916 and threshold calculator 918. For example, threshold identifier 922 may receive an input from threshold calculator 918 in the event that a given data set was deficient of any shutdowns, while threshold identifier 922 may receive operating points (corresponding to thresholds) on receiver operating characteristics from operating point calculator 916 in the event that a given data set did include one or more shutdowns. Further, threshold identifier 922 may be configured to evaluate and identify one or more optimal thresholds for both instances in which a data set included one or more shutdowns, as well as instances for which one or more data sets was deficient of shutdowns. That is to say that given an input of one or more operating points and/or thresholds for one or more given models, threshold identifier 922 may determine one or more optimal thresholds for one and/or both different possibilities in terms of the contents of inputted data sets.

Figure 9B:
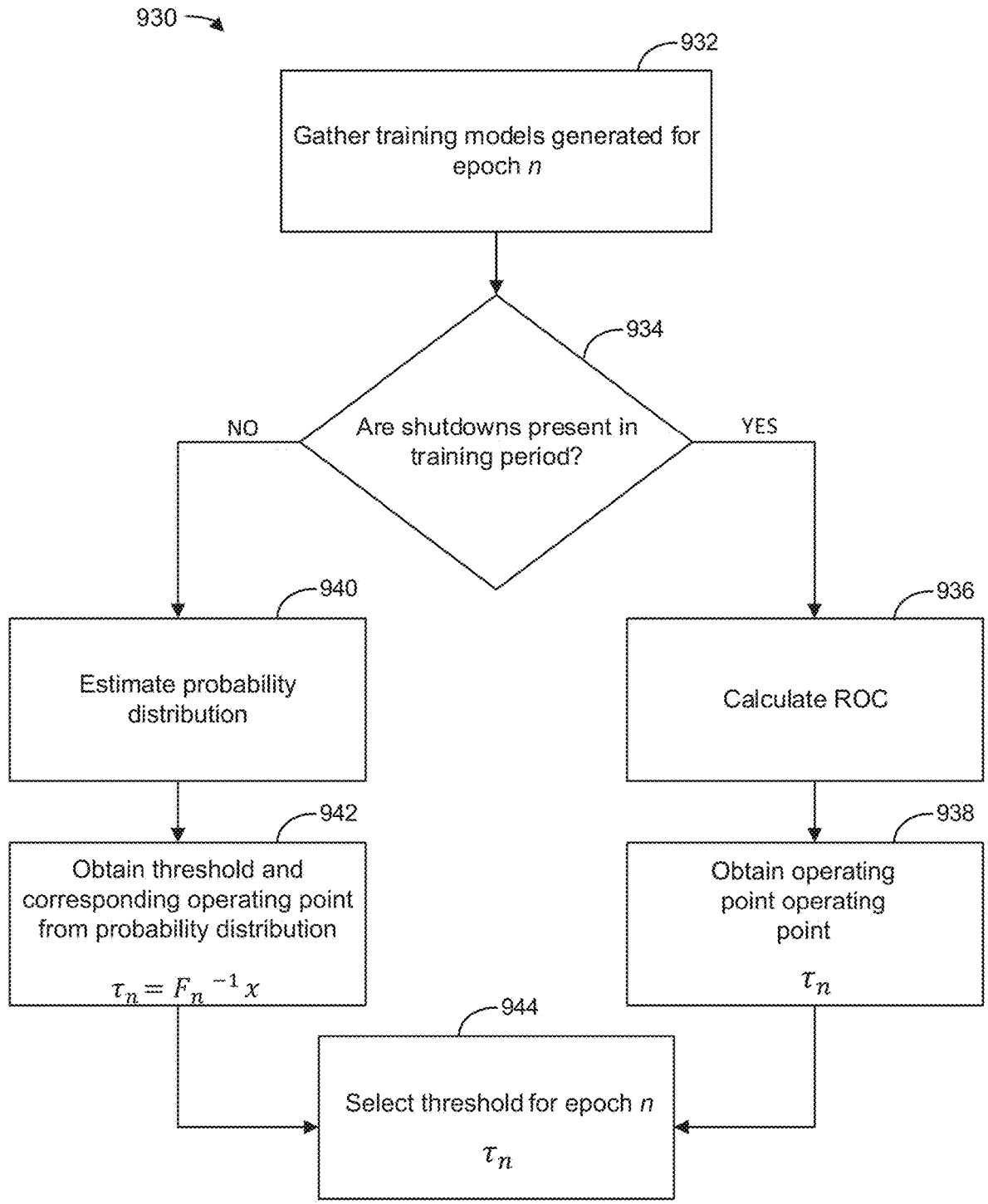
FIG. 9B is a flow diagram illustrating the system of FIG. 9A in greater detail, according to an exemplary embodiment.

Referring now to FIG. 9B, process for model evaluation 930 is shown. Process 930 may include multiple steps, according to some embodiments. Process 930 may also be structured to evaluate training data collected from chillers such as chiller 802 and corresponding chiller sensors 804 of FIG. 8A and/or other equipment in some embodiments. Further, the steps of process 930 can be performed by some and/or all of the components of system 900, according to some embodiments. For example, with reference to chiller 802 and corresponding chiller sensors 804 of FIG. 8A, chiller sensors 804 may collect data from chiller 802. Further, data collected by chiller sensors 804 from chiller 802 may be used to generate models with machine learning, deep learning, and/or transfer learning. Collected data used in the generation of those models, and by association the models themselves, may be evaluated using process 930.

In step 932, process 930 is shown to include gathering training models generated for epoch n. Step 932 may include model training data 904 of system 900, according to some embodiments. Training models may be generated according to training data, and training data may be collected from sources such as chiller sensors 804 of chiller 802 as seen in FIG. 8A. Further, training models and corresponding training data gathered in step 932 may be for a single time period, noted as epoch n in step 932. That is to say that models gathered in step 932 may all have been generated and trained using data from a single epoch, which is also to say that models gathered in step 932 may be representative of a single epoch. It should also be noted that models gathered in step 932 may be the same and/or different. For example, some models gathered in step 932 may use machine learning techniques and/or deep learning techniques and/or transfer learning techniques.

In step 934, process 930 is shown to include determining if shutdowns are present in the training period. Training data and corresponding training models may be evaluated using one or more methods to determine if the training period for which training data was collected and training models were generated includes shutdowns. Step 934 can include shutdown evaluator 906 of system 900, according to some embodiments. This evaluation may produce an outcome that yes, training data and model does include a shutdown, or no, training data and model does not include a shutdown. In the instance that such a determination may be made, different steps may be taken in terms of further analysis and calculations for training data and models. In some embodiments, training periods evaluated as part of step 934 may vary. Additionally, so too may shutdown activity. That is to say that training data used for different models may vary, and so too may the appearance of a shutdown in that training data. As such, step 934 may implement multiple methods in order to analyze data for a training period and determine if a shutdown occurred during said period.

In step 936, process 930 is shown to include calculating receiver operating characteristics. In calculating the receiver operating characteristics, various probability measures may also be considered. Step 936 can include ROC calculator 910 of system 900, according to some embodiments. In some embodiments, receiver operating characteristics may only be possible to calculate for models trained with data that included at least one shutdown. Additionally, receiver operating characteristics calculation of step 936 may vary according to model and training data. Receiver operating characteristics of step 936 can vary according to training data and model parameters such as duration of training period and model techniques (machine learning, deep learning, transfer learning, etc.). For example, the receiver operating characteristics may be calculated differently for training data from a longer time period (epoch) than for a shorter time period according to some embodiments.

In step 938, process 930 is shown to include obtaining operating points on the receiver operating characteristics. Step 938 can include operating point calculator 916 of system 900, according to some embodiments. In some embodiments, an operating point may be selected according to preferences of a user and/or operator. For example, if a user and/or operator desires optimized efficiency, step 938 can be configured to select an operating point that aligns with optimized efficiency. Further, step 938 can also include obtaining an operating point according to other factors such as maximized performance as well as other preferences. In step 938, the operating point obtained can correspond to a threshold, which can then be selected.

In step 940, process 930 is shown to include, in the event that shutdowns are present in the training period, estimating a probability distribution. Step 940 can include distribution estimator 908 of system 900, according to some embodiments. Models for which the training data does not include a shutdown may not allow for calculation of receiver operating characteristics. As such, the alternative method of step 940 is used in which the probability distribution is estimated. The probability distribution of step 940 can also be a measure of a probability density function, which may vary according to training data and model parameters such as duration of training period and model techniques (machine learning, deep learning, transfer learning, etc.).

In step 942, process 940 is shown to include obtaining an operating point configured as a percentile point on the probability distribution of step 940. In some embodiments, the operating point may be restricted and/or selected according to preferences of a user and/or operator. Step 942 can include threshold calculator 918 of system 900, according to some embodiments. For example, if a user desired maximized output, the operating point of step 942 can be selected accordingly. Additionally, the operating point of step 942 can correspond to a threshold on the probability distribution. In some embodiments, the selection of the operating point can correspond to a threshold to be applied to a model.

In step 944, process 940 is shown to include the selection of a threshold. Depending on training data for models, operating points and thresholds may be determined differently. In some embodiments, thresholds obtained for models based on the operating points obtained in step 938 and/or step 942 may be determined by similar and/or the same means in step 944. Step 944 can include threshold identifier 922 of system 900, according to some embodiments. For example, thresholds determined based on calculating receiver operating characteristics and identifying operating points thereon can be similar to or the same as thresholds determined by estimating a probability distribution and identifying operating points as percentile points thereon. Further to the previous example, thresholds determined in step 944 can be comparable whether determined by the same or similar methods or different methods, such as the two differing methods of process 940.

Figure 9C:
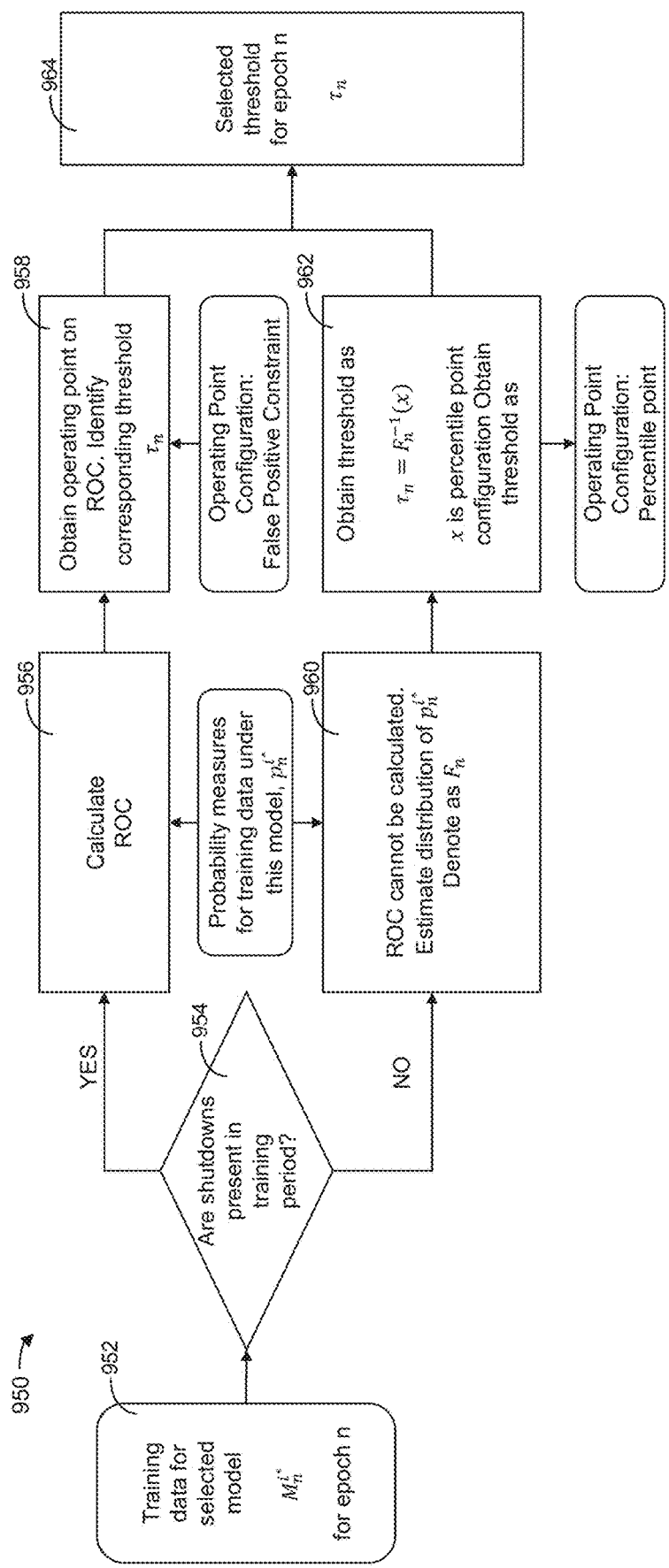
FIG. 9C is another flow diagram of the process illustrated in FIG. 9B, according to an exemplary embodiment.

Referring now to FIG. 9C, a flow diagram of a process for threshold calculation and selection 950 is shown. Process 950 can be similar to process 930, according to some embodiments. It should also be noted that process 950 can be applied to various training data and models generated thereof for chillers. In some embodiments, the models for which process 950 is conducted can employ machine learning, deep learning, and/or transfer learning techniques. Further, the training data associated with the aforementioned models can also vary in time period as well as contents of the data. Additionally, components seen in FIG. 9A can be used to perform some and/or all of process 950, according to some embodiments.

Process 950 is shown to include collecting training data for selected models 952. Training data of collecting training data for selected models 952 can be from a single epoch, according to some embodiments. Further, training data of collecting training data for selected model 952 can also vary by time period, contents, and other factors. Similarly, models generated by training data of collecting training data for selected model 952 may also vary according to techniques implemented which can include machine learning, deep learning, and/or transfer learning. Process 950 is also shown to include identification of shutdowns 954. Identification of shutdowns can involve analyzing training data of collecting training data for selected model 952, according to some embodiments. Training data of collecting training data for selected model 952 can also vary according to time duration for data as well as contents of the data, which can result in multiple data analysis techniques being used in identification of shutdowns 954 in order to detect any shutdowns present in data.

Process 950 is shown to include calculating receiver operating characteristics (ROC) 956 in response to identification of shutdowns present in training data. In some embodiments, calculating receiver operating characteristics 956 can include the incorporation of various probability measures. Depending on the contents of training data of process 950, the result of the receiver operating characteristics can vary. Process 950 is shown to include obtaining operating points on receiver operating characteristics 958. Operating point of obtaining operating points on receiver operating characteristics 958 can also correspond to a threshold and can also serve as a false positive constraint, according to some embodiments. Process 950 is shown to include estimating a probability distribution 960 in response to determining that training data is free of shutdowns. In some embodiments, probability estimation of estimating a probability distribution 960 can correspond to a measure of a probability density function and can vary according to the contents of training data for which the probability distribution was estimated. Process 950 is shown to include obtaining an operating point as a percentile point 962 on the estimated probability distribution of p-measures, according to some embodiments. Operating point of obtaining an operating point as a percentile point 962 can, in some embodiments, correspond to a threshold.

Process 950 is shown to include selecting a threshold for an epoch 964. Threshold of selecting a threshold for an epoch 964 can, in some embodiments, be similar and/or the same independent of the calculation means implement in order to determine said threshold. Further, threshold of selecting a threshold for an epoch 964 can be determined to allow for optimal operation of one or more models, according to some embodiments. Thresholds determined in selecting a threshold for an epoch 964 can also vary according to any user and/or operator preferences. For example, if a user and/or operator desired maximized output rather than efficiency, thresholds selected in selecting a threshold for an epoch 964 can be modified to reflect such preferences. Additionally, thresholds of selecting a threshold for an epoch 964 are selected and implemented in order to provide a reference point by which anomalous data can be recognized, which is to say that data detected by operating models that exceeds thresholds of selecting a threshold for an epoch 964 can be identified as anomalous.

Figure 10:
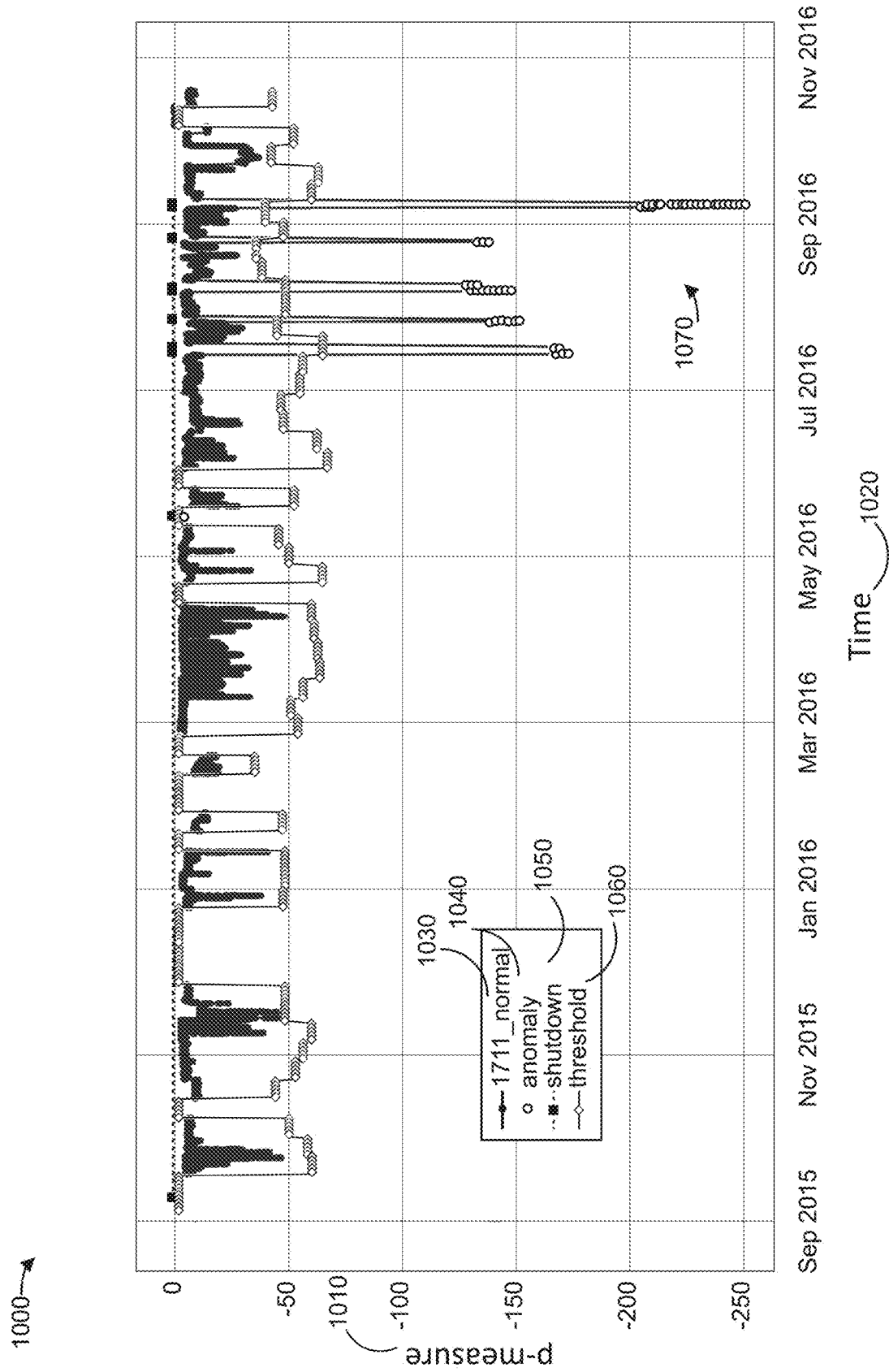
FIG. 10 is a chart illustrating p-measures of equipment data applied to a selected threshold, according to an exemplary embodiment.

Referring now to FIG. 10, a time plot 1000 is shown. Time plot 1000 shows an automatic threshold selection, according to some embodiments. Time plot 1000 can be generated by stitching together adjacent test windows for a given chiller. Time plot 1000 can correspond to chiller 802 of FIG. 8A or can be another similar and/or different chiller. Multiple epochs can be seen in plot 1000, which shows data spanning a 15-month time frame.

Time plot 1000 is shown to include a y-axis 1010. Y-axis 1010 is shown to include a measure of calculated p-measures, spanning in value from 0 to −250, according to some embodiments. In some embodiments, p-measure of y-axis 1010 can be calculated as a natural log of a probability that data at a time point is not anomalous (normal). Time plot 1000 is also shown to include an x-axis 1020. X-axis is shown to include a measure of time, scaled every other month for a total of 15 months. As seen on x-axis 1020, data shown on time plot 1000 corresponds to a total time period of September of 2015 to November of 2016, according to some embodiments.

Time plot 1000 is shown to include four sets of data, which includes normal data 1030, anomaly data 1040, shutdown data 1050, and threshold data 1060. Normal data 1030 can be seen as a p-measure selected every epoch for a given model. On time plot 1000, it can be seen that normal data 1030 fluctuates between approximate values of 0 and −50 according to the p-measure on y-axis 1010. Normal data 1030 can also be considered to be non-anomalous data, which is to say that normal data 1030 is free of anomalies. Normal data 1030 can be indicative of standard and expected chiller operation. Time plot 1000 is also shown to include anomaly data 1040, according to some embodiments. Anomaly data 1040 can also be considered non-normal data, according to some embodiments. Anomaly data 1040 is seen to fluctuate between approximate values of 0 and −250 and is seen to have the greatest approximate range of values, according to some embodiments. Anomaly data 1040 can correspond to a time period in close proximity to a fault event for a chiller, for example a shutdown or other event that can be classified as a chiller fault. Time plot 1000 is also shown to include shutdown data 1050. In some embodiments, shutdown data 1050 can be indicative of a shutdown or other chiller fault that occurred. As such, shutdown data 1050 can have an approximate p-measure value of 0. Further, in some embodiments shutdown data 1050 can be indicative of a lack of chiller activity which can be due to factors including a shutdown due to loss of power, necessary maintenance, malfunction, and other factors. Time plot 1000 is also shown to include threshold data 1060. In some embodiments, threshold data 1060 can correspond to one or more thresholds that have been determined by a component such as threshold identifier 922 of FIG. 9A. Further, threshold data 1060 can be dynamic in some embodiments, as seen on time plot 1000 in which threshold data fluctuates between p-measures of approximately 0 and −70. In some embodiments, threshold data 1060 can be dependent on other data as well as various calculations, identifications and determinations.

Time plot 1000 is also shown to include an anomaly area 1070. Anomaly area 1070 is shown to include a concentration of anomaly data 1040, according to some embodiments. Anomaly data 1040 can, in some embodiments, be indicative of a possible shutdown. Anomaly area 1070 includes a concentration of anomaly activity, which can correspond to shutdown activity as seen by shutdown data 1050, according to some embodiments. The time period of time plot 1000 defined on x-axis 1020 as July 2016 to November 2016 includes anomaly area 1070, according to some embodiments. Within this time period, a plurality of shutdown data 1050 is present, which can correspond to a plurality of anomaly data 1040, according to some embodiments. It should be noted that, in some embodiments, the fluctuation of normal data 1030 is lesser than that of anomaly data as seen in anomaly area 1070. Time plot 1000 indicates, according to some embodiments, dynamic threshold activity as seen by threshold data 1060, with anomaly activity including anomaly data 1040 having p-measure values exceeding p-measure values of threshold data 1060, as well as shutdown data 1050 with p-measure values of approximately 0. In some embodiments, establishment of a threshold as seen by threshold data 1060 a presence of anomaly data 1040 exceeding the p-measure values of threshold data 1060 can lead to generation of a fault and/or shutdown prediction.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain operation or group of operations.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A model management system for building equipment, the system comprising:
   one or more memory devices configured to store instructions that, when executed on one or more processors, cause the one or more processors to:
   determine whether fault data exists in equipment data used to generate a plurality of shutdown prediction models for the building equipment;
   generate a first performance evaluation value for each of the plurality of shutdown prediction models using a first evaluation technique in response to a determination that the fault data exists in the equipment data;
   generate a second performance evaluation value for each of the plurality of shutdown prediction models using a second evaluation technique in response to a determination that the fault data does not exist in the equipment data; and
   select one of the plurality of shutdown prediction models based on the first performance evaluation value and the second performance evaluation value.

2. The system of claim 1, wherein the building equipment comprise air handling units.

3. The system of claim 1, wherein the instructions cause the one or more processors to:
   receive the equipment data for one or more devices of the building equipment, the equipment data indicating performance of the one or more devices; and
   generate the plurality of shutdown prediction models based on the equipment data.

4. The system of claim 1, wherein the instructions cause the one or more processors to:
   in response to identifying the fault data in the equipment data, calculate receiver operating characteristics for the equipment data; and
   determine an area under a curve of the receiver operating characteristics.

5. The system of claim 1, wherein the instructions cause the one or more processors to:
   in response to identifying that the equipment data is deficient of any fault data, calculate a standard deviation normalized by mean for a measure of a probability density function for the equipment data; and determine an inverse of the standard deviation normalized by mean for the measure of the probability density function.

6. The system of claim 1, wherein the instructions cause the one or more processors to
receive the equipment data for a plurality of epochs, wherein the plurality of shutdown prediction models are generated for each of the plurality of epochs.

7. The system of claim 1, wherein the instructions cause the one or more processors to select a shutdown prediction model with a greatest value resulting from a calculated area under a curve of receiver operating characteristics or a calculated inverse of a standard deviation normalized by mean for each epoch.

8. The system of claim 1, wherein the instructions cause the one or more processors to:
train each of the plurality of shutdown prediction models with different sets of hyper-parameters; and
select the set of hyper-parameters for each of the plurality of shutdown prediction models that produces a most accurate prediction.

9. The system of claim 1, wherein the instructions cause the one or more processors to generate or update a fault prediction using the selected shutdown prediction model.

10. A method for managing models for building equipment, the method comprising:
determining whether fault data exists in equipment data used to generate a plurality of shutdown prediction models for the building equipment;
generating a first performance evaluation value for each of the plurality of shutdown prediction models using a first evaluation technique in response to a determination that fault data exists in the equipment data;
generating a second performance evaluation value for each of the plurality of shutdown prediction models using a second evaluation technique in response to a determination that the fault data does not exist in the equipment data; and
selecting one of the plurality of shutdown prediction models based on the first performance evaluation value and the second performance evaluation value.

11. The method of claim 10, wherein the building equipment comprise air handling units.

12. The method of claim 10, further comprising:
receiving the equipment data for one or more devices of the building equipment, the equipment data indicating performance of the one or more devices; and
generating the plurality of shutdown prediction models based on the equipment data.

13. The method of claim 10, further comprising:
in response to identifying the fault data in the equipment data, calculating receiver operating characteristics for the equipment data; and
determining an area under a curve of the receiver operating characteristics.

14. The method of claim 10, further comprising:
in response to identifying that the equipment data is deficient of any fault data, calculating a standard deviation normalized by mean for a measure of a probability density function for the equipment data; and
determining an inverse of the standard deviation normalized by mean for the measure of the probability density function.

15. The method of claim 10, further comprising receiving the equipment data for a plurality of epochs, wherein the plurality of shutdown prediction models are generated for each of the plurality of epochs.

16. The method of claim 10, further comprising selecting a shutdown prediction model with a greatest value resulting from a calculated area under a curve of receiver operating characteristics or a calculated inverse of a standard deviation normalized by mean for each epoch.

17. The method of claim 10, further comprising:
training each of the plurality of shutdown prediction models with different sets of hyper-parameters; and
selecting the set of hyper-parameters for each of the plurality of shutdown prediction models that produces a most accurate prediction.

18. The method of claim 10, further comprising generating or updating a fault prediction using the selected shutdown prediction model.

19. A model management system for building equipment, the system comprising:
one or more processors configured to:
determine whether fault data exists in equipment data used to generate a plurality of shutdown prediction models for the building equipment;
generate a first performance evaluation value for each of the plurality of shutdown prediction models using a first evaluation technique in response to a determination that the fault data exists in the equipment data;
generate a second performance evaluation value for each of the plurality of shutdown prediction models using a second evaluation technique in response to a determination that the fault data does not exist in the equipment data; and
select one of the plurality of shutdown prediction models based on the first performance evaluation value and the second performance evaluation value.

20. The system of claim 19, wherein the one or more processors are configured to:
receive the equipment data for one or more devices of the building equipment, the equipment data indicating performance of the one or more devices; and
generate the plurality of shutdown prediction models based on the equipment data.

* * * * *